(12) United States Patent
Heiner et al.

(10) Patent No.: US 8,731,721 B2
(45) Date of Patent: *May 20, 2014

(54) CONTINUOUS POLYMER SYNTHESIZER

(75) Inventors: David L. Heiner, San Diego, CA (US);
Aaron C. Jones, San Diego, CA (US);
Steven P. Fambro, Carlsbad, CA (US);
Mark J. Nibbe, San Diego, CA (US);
Steve R. Burgett, San Diego, CA (US);
Brett M. Ellman, Cardiff, CA (US);
Michal Lebl, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 650 days.

This patent is subject to a terminal disclaimer.

(21) Appl. No.: 13/029,071

(22) Filed: Feb. 16, 2011

(65) Prior Publication Data

US 2011/0136696 A1 Jun. 9, 2011

Related U.S. Application Data

(62) Division of application No. 11/521,573, filed on Sep. 13, 2006.

(60) Provisional application No. 60/717,376, filed on Sep. 14, 2005.

(51) Int. Cl.
*G05B 21/00* (2006.01)

(52) U.S. Cl.
USPC ............................................. 700/268

(58) Field of Classification Search
CPC ................................................. G01N 35/025
USPC ............................... 436/48, 45, 50, 55
See application file for complete search history.

(56) References Cited

U.S. PATENT DOCUMENTS

| 1,241,539 A | 10/1917 | Meirowsky |
| 3,586,484 A | 6/1971 | Anderson |

(Continued)

FOREIGN PATENT DOCUMENTS

| EP | 0569115 | 11/1993 |
| EP | 0445915 | 8/1995 |

(Continued)

OTHER PUBLICATIONS

Krchňák, et al. (1996) MARS: Multiple automated robotic synthesizer for continuous flow of peptides. Peptide Res., 9(1)45-49.

(Continued)

*Primary Examiner* — Natalia Levkovich
(74) *Attorney, Agent, or Firm* — Knobbe, Martens, Olson & Bear LLP

(57) ABSTRACT

Described is a system and method for synthesizing polymeric molecules such as oligonucleotides and polypeptides. The system is capable of continuously synthesizing molecules by providing an array of reaction sites and an array of stations for carrying out synthetic manipulations. The reaction sites in the former array can be placed in a fixed order and at fixed intervals relative to each other. Similarly, the stations can be placed in a fixed order and at fixed intervals relative to each other. The two arrays can be moved relative to each other such that the stations carry out desired steps of a reaction scheme at each reaction site. The relative locations of the stations and the schedule for the relative movement can correlate with the order and duration of reaction steps in the reaction scheme such that once a reaction site has completed a cycle of interacting with the full array of stations then the reaction scheme is complete.

10 Claims, 14 Drawing Sheets

(56) References Cited

U.S. PATENT DOCUMENTS

| | | |
|---|---|---|
| 3,712,535 A | 1/1973 | Genese et al. |
| 3,722,789 A | 3/1973 | Kennedy |
| 4,042,338 A | 8/1977 | Huber |
| 4,236,666 A | 12/1980 | Aeschlimann et al. |
| 4,244,694 A | 1/1981 | Farina et al. |
| 4,285,463 A | 8/1981 | Intengan |
| 4,287,154 A | 9/1981 | Sommers |
| 4,412,973 A | 11/1983 | Guigan |
| 4,808,380 A | 2/1989 | Minekane |
| 4,844,868 A | 7/1989 | Rokugawa |
| 4,862,932 A | 9/1989 | Feinstein et al. |
| 4,906,433 A | 3/1990 | Minekane |
| 5,045,047 A | 9/1991 | Hutchins et al. |
| 5,084,242 A | 1/1992 | Sakuma et al. |
| 5,089,417 A | 2/1992 | Wogoman |
| 5,105,305 A | 4/1992 | Betzig et al. |
| 5,178,602 A | 1/1993 | Wells |
| 5,202,418 A | 4/1993 | Lebl et al. |
| 5,338,831 A | 8/1994 | Lebl et al. |
| 5,342,585 A | 8/1994 | Lebl et al. |
| 5,434,083 A | 7/1995 | Mitsumaki et al. |
| 5,472,672 A | 12/1995 | Brennan |
| 5,501,984 A | 3/1996 | Hofstetter et al. |
| 5,514,789 A | 5/1996 | Kempe |
| 5,529,756 A | 6/1996 | Brennan |
| 5,585,068 A | 12/1996 | Panetz et al. |
| 5,614,608 A | 3/1997 | Krchnak et al. |
| 5,633,972 A | 5/1997 | Walt et al. |
| 5,707,331 A | 1/1998 | Wells et al. |
| 5,888,723 A | 3/1999 | Sutton et al. |
| 6,045,755 A | 4/2000 | Lebl et al. |
| 6,045,760 A | 4/2000 | Aizawa et al. |
| 6,121,054 A | 9/2000 | Lebl |
| 6,130,046 A | 10/2000 | Hubbell et al. |
| 6,264,891 B1 | 7/2001 | Heyneker et al. |
| 6,357,907 B1 | 3/2002 | Cleveland et al. |
| 6,375,898 B1 | 4/2002 | Ulrich |
| 6,663,832 B2 | 12/2003 | Lebl et al. |
| 6,846,460 B1 | 1/2005 | Lebl |
| 2002/0031833 A1* | 3/2002 | Heyneker et al. ............. 436/46 |
| 2002/0044894 A1 | 4/2002 | Lebl et al. |
| 2002/0120128 A1 | 8/2002 | Stockl |
| 2004/0219063 A1 | 11/2004 | Heiner et al. |

FOREIGN PATENT DOCUMENTS

| | | |
|---|---|---|
| EP | 1128310 | 8/2001 |
| JP | 61139756 | 6/1986 |
| WO | WO 99/65602 | 12/1999 |
| WO | WO 99/04228 | 1/2000 |
| WO | WO 00/44491 | 8/2000 |
| WO | WO 02/04123 | 1/2002 |
| WO | WO 02/16040 | 2/2002 |

OTHER PUBLICATIONS

Lebl, M. (1999) New technique for hign-throughput synthesis. Bioorganic & Medicinal Chemistry Letters 9:1305-1310.

Lebl, M. (1998) A new approach to automated solid phase synthesis based on centrifugation of tilted plates. J. Assoc. Lab. Automat. 3(3):59-61.

Menotti et al. (1994) Facile manual synthesis of peptide libraries. Prot. & Pep. Lett. 1(3):187-192.

Chinese Office Action for Chinese Application No. 200680035723.9; Applicant: Illumina, Inc.; dated Dec. 4, 2009, 7 pgs.

* cited by examiner

FIG. 10

CONTINUOUS POLYMER SYNTHESIZER

CROSS REFERENCE TO RELATED APPLICATIONS

This application is a divisional of U.S. patent application Ser. No. 11/521,573, filed on Sep. 13, 2006 which claims priority under 35 U.S.C. §119(e) to U.S. Provisional Application No. 60/717,376 filed Sep. 14, 2005, which is hereby incorporated by reference in its entirety.

BACKGROUND OF THE INVENTION

1. Field of the Invention

The present embodiments relates to systems and methods for synthesizing molecules such as polymers. More specifically, the present embodiments relate to devices and methods for continuously synthesizing biological polymers such as polypeptides and oligonucleotides.

2. Description of the Related Art

Oligonucleotides are among the most important and prevalent reagents used in biotechnology laboratories engaged in research, diagnostics and therapeutics. The high demand for oligonucleotides derives from their exquisite specificity for complementary nucleotide sequences in DNA or RNA obtained from biological samples. This specificity allows oligonucleotides to be used as probes that specifically bind to unique sequences present in less than part-per-billion abundance in a complex biological milieu. This specificity can be used in order to provide a diagnosis for an individual at risk for a particular disease based on the presence or absence of a gene sequence known to be associated with the disease. Furthermore, this specificity also forms the basis for use of oligonucleotides as reagents for synthesizing molecules of DNA or RNA having a particular nucleotide sequence of interest. For example, a gene sequence associated with a particular disease can be cloned by binding one or more oligonucleotides to the gene sequence and then performing an amplification reaction on the bound complex to make multiple copies of the sequence. The cloned gene sequence can subsequently be utilized for research into the disease or can even be used for therapeutic treatment of individuals afflicted with the disease.

Oligonucleotide synthesis is a cyclical process that assembles a chain of nucleotides. Nucleotides are added one by one through a cycle of chemical reactions, in which a particular molecule (e.g., a nucleotide) is added to a growing DNA molecule (e.g., a growing DNA chain), sometimes via catalysis, until the desired chain is complete. Generally, each cycle of chemical reactions includes the steps of detritylation, coupling, capping and oxidation. During the detritylation or "deprotection" step, a dimethoxytrityl (DMT) group is removed from the last nucleotide of the growing DNA chain to allow the addition of the next nucleotide. The amount of DMT released from each cycle is monitored to determine coupling efficiency. The release of DMT is apparent because a bright orange color is emitted as DMT is released.

Similar synthetic methods can be used to produce oligonucleotides at a variety of throughputs to satisfy demands spanning those of small laboratories to large manufacturing facilities. The methods themselves are relatively robust being capable of handling oligonucleotides of varying length from just a few nucleotides per molecule to over 100 nucleotides per molecule. Furthermore, the methods are capable of producing oligonucleotides having a myriad number of different sequences, the complexity of which is illustrated by the fact that the number of different decamers (molecules having 10 nucleotides) that can be made using just the 4 common DNA nucleotides (A, T, C and G) is $4^{10}=1,048,576$.

Typically, large manufacturing facilities achieve high throughput by employing a large number of synthesizers that are similar to those used in smaller laboratories. These synthesizers are typically configured to perform individual steps of the monomer addition cycle in succession, and can do so for several different oligonucleotides in parallel. Thus, the sequence of reactions for a plurality of oligonucleotides is performed in order such that detritylation is carried out for each oligonucleotide, then coupling is carried out for each oligonucleotide, followed by capping of each oligonucleotide followed by oxidation of each oligonucleotide. The cycle is then repeated until full length oligonucleotides are obtained.

Although a large number of such synthesizers can be employed to achieve relatively high throughput, this scale-up approach can result in unwanted inefficiencies. An example of such inefficiency is the time that each synthesizer sits idle while waiting for individual incubation steps to be completed prior to delivery of the next reagent to any of the reactions. Furthermore, instruments can experience substantial down time between synthesis reactions when new reaction vessels or reagents are reloaded.

What is needed are synthetic methods and devices that allow parallel synthesis of oligonucleotides and other molecules such that a plurality of reactions can be carried out and monitored without interruption. The present embodiments satisfy this need and provides other advantages as well.

SUMMARY OF THE INVENTION

The present embodiments provide a system for continuously synthesizing molecules, whereby the molecules are synthesized by performing sequential steps of a reaction. The system can include (a) a stage configured to accept an array of reaction sites; (b) an array of stations including (i) reagent dispensing stations configured to separately and sequentially provide synthesis reaction solutions to a plurality of the reaction sites for the sequential steps, and (ii) imaging stations configured to obtain images of at least one of the plurality of reaction sites; and (c) a control system configured to move the stage or the array of stations so that the plurality of reaction sites sequentially communicate with at least one of the dispensing stations and at least one of the imaging stations, and wherein the control system is further configured to allow replacement of a first reaction site from the array of reaction sites with a second reaction site while the system continuously synthesizes molecules at other reaction sites of the plurality of reaction sites.

Further embodiments provide system for continuously synthesizing molecules, comprising: (a) a stage comprising a plurality of reaction sites in a fixed order and at fixed distances from one another, (b) a plurality of dispensing stations configured to deliver reagents to said reaction sites to start a reaction, wherein said dispensing stations are located along said stage at fixed distances from one other; and (c) a control system configured to sequentially dispense said reagents into said reaction sites on a predetermined schedule so that a first reaction in a reaction site is completed before a second reaction in said reaction site is initiated and wherein said distances and said schedule correlate to the order and the duration of steps required to complete said reaction.

The present embodiments further provide a method of continuously synthesizing molecules, whereby the molecules are synthesized by performing sequential steps of a reaction. The method can include the steps of (a) providing a stage including an array of reaction sites; (b) sequentially providing synthesis reaction solutions to a plurality of the reaction sites from reagent dispensing stations configured to separately and sequentially provide synthesis reaction solutions to the reaction sites for the sequential steps; (c) sequentially obtaining images of at least one of the plurality of reaction sites at imaging stations; and (d) replacing a first reaction site from the array of reaction sites with a second reaction site while the system continuously synthesizes molecules at other reaction sites of the plurality of reaction sites.

Further embodiments provide a system for continuously synthesizing molecules, comprising (a) a stage comprising a plurality of reaction sites in a fixed order and at fixed distances from one another, (b) a plurality of dispensing stations configured to deliver reagents to said reaction sites to start a reaction, wherein said dispensing stations are located along said stage at a fixed distances from one other and wherein said distances correlate to the time required to complete said reaction; and (c) means for sequentially dispensing said reagents into said reaction sites on a predetermined schedule so that a first reaction in a reaction site is completed before a second reaction in said reaction site is initiated and wherein said distances and said schedule correlate to the order and the duration of steps required to complete said reaction.

Also provided is a system for continuously synthesizing polymers, whereby monomers are added to a growing polymer by repeating sequential steps of a reaction. The system can include (a) a stage including an array of modules, the modules configured to accept an array of reaction sites in a fixed order and at fixed intervals; (b) an array of stations for performing the sequential steps, including (i) dispensing stations configured to provide synthesis reaction solutions for the sequential steps to a plurality of the reaction sites, and (ii) imaging stations configured to obtain images of at least one of the plurality of reaction sites; (c) at least one solution removal device configured to remove the synthesis reaction solutions from the plurality of reaction sites, wherein the relative locations of the stations are fixed with respect to the array of stations; and (d) a control system configured to move the array of modules or the array of stations on a schedule for sequential communication of the plurality of reaction sites with the stations and removal of the solutions by the at least one solution removal device, wherein the relative locations of the stations and the schedule correlate with the order and duration of the sequential steps of the reaction.

The present embodiments also provide a method for continuously synthesizing molecules, comprising (a) providing a stage comprising a plurality of reaction sites in a fixed order and at fixed distances from one another, (b) providing a plurality of dispensing stations configured to deliver reagents to said reaction sites to start a reaction, wherein said dispensing stations are located along said stage at a fixed distances from one other and wherein said distances correlate to the time required to complete said reaction; and (c) sequentially dispensing said reagents into said reaction sites on a predetermined schedule so that a first reaction in a reaction site is completed before a second reaction in said reaction site is initiated, and wherein said distances and said schedule correlate to the order and the duration of steps required to complete said reaction.

Further provided is a method of continuously synthesizing polymers, whereby monomers are added to a growing polymer by repeating sequential steps of a reaction. The method can include the steps of (a) providing a stage including an array of reaction sites, wherein the reaction sites are placed in a fixed order and at fixed intervals; (b) providing an array of stations for performing the sequential steps, including (i) dispensing stations configured to provide synthesis reaction solutions for the sequential steps to a plurality of the reaction sites, and (ii) imaging stations configured to obtain images of at least one of the plurality of reaction sites; (c) providing at least one solution removal device configured to remove the synthesis reaction solutions from the plurality of reaction sites, wherein the relative locations of the stations are fixed with respect to the array of stations; and (d) moving the array of reaction sites or the array of stations on a schedule for sequential communication of the plurality of reaction sites with the stations and removal of the solutions by the at least one solution removal device, wherein the relative locations of the stations and the schedule correlate with the order and duration of the sequential steps of the reaction.

The present embodiments further provide a method of continuously synthesizing polymers, whereby monomers are added to a growing polymer by repeating sequential steps of a reaction. The method can include the steps of (a) providing a circular table including an array of modules, the modules configured to accept an array of multi-well plates in a fixed order and at fixed intervals along a circular path; (b) rotating the circular table such that each multi-well plate of the array of multi-well plates sequentially communicates with an array of stations in order of (i) providing deblock reagent to the multi-well plate at a deblock reagent dispensing station, (ii) removing the deblock reagent from the multi-well plate at a deblock reagent removal station after a predefined time interval from the adding deblock reagent, (iii) providing monomer reagent to the multi-well plate at a monomer reagent dispensing station, (iv) removing the monomer reagent from the multi-well plate at a base reagent removal station after a predefined time interval from the adding monomer reagent, (vii) providing cap reagent to the multi-well plate at a cap reagent dispensing station, and (viii) removing the cap reagent from the multi-well plate at a cap reagent removal station after a predefined time interval from the adding cap reagent, wherein the dispensing stations are configured as an array of stations in a fixed spatial relationship corresponding to the order of the sequential steps of the reaction; performing repetitions of step (b) for each of a first, second and third multi-well plate, wherein the second multi-well plate is unloaded from a first module and the third multi-well plate is loaded to the first module while the system continuously synthesizes polymers at the first multi-well plate, wherein at least one of the repetitions for the first multi-well plate occurs simultaneously with at least one of the repetitions for the second multi-well plate, and wherein at least one of the repetitions for the first multi-well plate occurs simultaneously with at least one of the repetitions for the third multi-well plate.

Also provided is a system for continuously synthesizing polymers, whereby monomers are added to a growing polymer by repeating sequential steps of a reaction. The system can include a stage including an array of multi-well plates, wherein the multi-well plates are placed in a fixed order and at fixed intervals along a circular path; an array of dispensing stations configured to provide synthesis reaction solutions for the steps to the multi-well plates, wherein the relative locations of the dispensing stations are in a fixed spatial relationship corresponding to the order of the sequential steps; and a control system configured to move the array of dispensing stations or the array of multi-well plates and to actuate the dispensing stations, wherein the dispensing stations dispense solutions to the multi-well plates while the array of dispensing stations or the array of multi-well plates is moving.

The present embodiments further provide a method of continuously synthesizing polymers, whereby monomers are added to a growing polymer by repeating sequential steps of a reaction. The method can include the steps of providing a stage including an array of multi-well plates, wherein the multi-well plates are placed in a fixed order and at fixed intervals along a circular path; providing an array of dispensing stations configured to provide synthesis reaction solutions for the steps to the multi-well plates, wherein the relative locations of the dispensing stations are in a fixed spatial relationship corresponding to the order of the sequential steps; moving the array of dispensing stations or the array of multi-well plates; and dispensing reaction solutions for the sequential steps of the reaction from the dispensing stations while the array of dispensing stations or the array of multi-well plates is moving.

BRIEF DESCRIPTION OF THE DRAWINGS

FIG. 10 shows a screen shot of a user interface for constructing and modifying a firing table.

DETAILED DESCRIPTION

Figure 1:
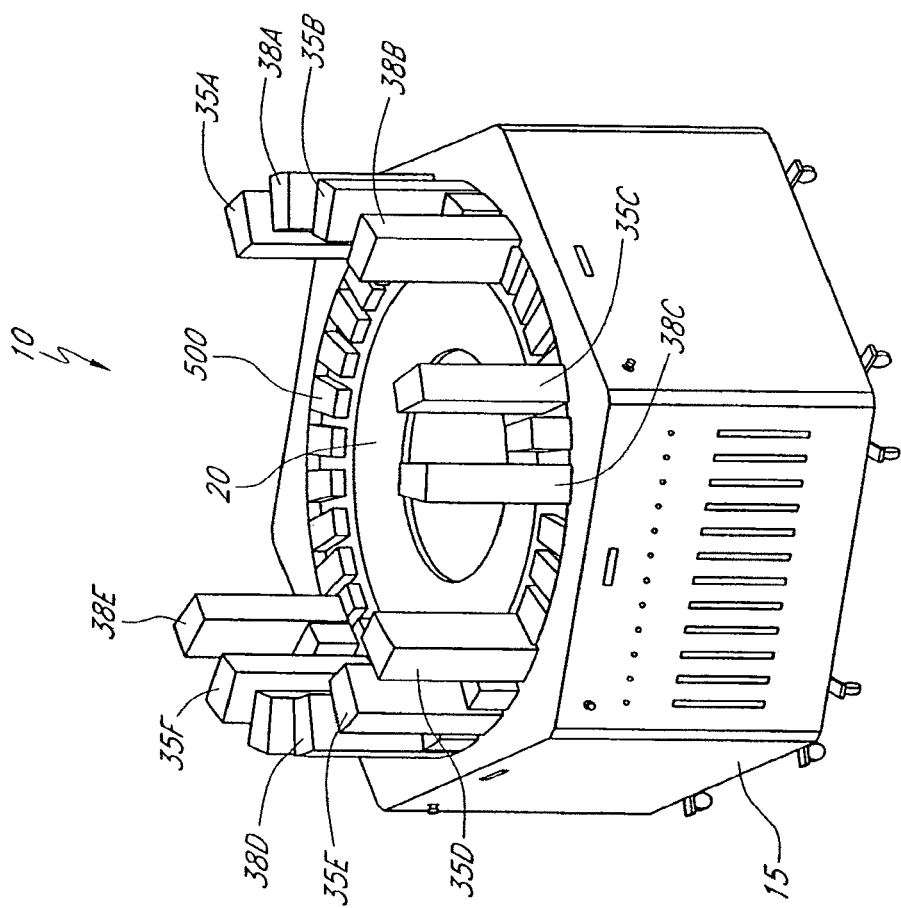
FIG. 1 is a perspective view of one embodiment of a continuous oligonucleotide synthesizer.

Some embodiments relate to a system for continuously synthesizing a plurality of different molecules, such as polymeric molecules. Systems of the embodiments can be configured to include an array of reaction sites and an array of stations for carrying out synthetic manipulations. The reaction sites in the array can be placed in a fixed order and at fixed intervals relative to each other. For example, an array of microtiter plates can be placed along the outer edge of a circular table. Each reaction site (i.e. well) can be assigned a different target product compared to the products to be synthesized at other reaction sites in the array. Similarly, the stations can be placed in a fixed order and at fixed intervals relative to each other. For example, the stations can be placed in a circular array having a perimeter that corresponds to the layout for the array of microtiter plates. Each of the stations can be configured to carry out a different manipulation compared to other stations in the array. The two arrays can be moved relative to each other such that the stations carry out desired steps of a reaction scheme at each reaction site. The relative locations of the stations and the schedule for the relative movement can correlate with the order and duration of reaction steps in the reaction scheme such that once a reaction site has completed a cycle of interacting with the full array of stations then the reaction scheme is complete. For example, oligonucleotides contained in microtiter plates on the circular table can each be extended by addition of a single nucleotide if the order of the stations, spacing between the stations and rate of passage for each plate corresponds to the order of reagent delivery and reaction time for a complete monomer addition reaction cycle.

In accordance with the configuration set forth above, and described in further detail below, each lap (or full revolution in embodiments where a circular table is used) completed by an individual reaction site can correspond to addition of a single nucleotide to the growing oligonucleotide chain. Furthermore, several reaction sites present in an array of reaction sites concurrently move along similar, repeated laps through the system, thereby resulting in continuous synthesis by the system. Using a system or method of the embodiments, reagents can be actively delivered or removed from a first reaction site in accordance with a first reaction step while incubation, or some other reaction step, occurs at a second reaction site. (The identifiers "first" and "second" are used throughout this disclosure for purposes of distinguishing two nouns and, unless indicated otherwise, are not intended to denote a spatial or temporal order) Thus, an array of stations can be configured in a spatial and temporal relationship with an array of reaction sites such that reactions occur at multiple reaction sites concurrently even as the reaction sites are subjected to different steps of the reaction at any given time, thereby allowing continuous and simultaneous reactions to be performed.

Some embodiments provide a system that is configured to allow replacement of a first reaction site with a second reaction site while the system continuously synthesizes molecules at a third reaction site. Thus, a first reaction site (or matrix of reaction sites, such as a microtiter plate) can be individually added or removed from the system without interrupting synthesis reactions occurring at another reaction site (or matrix of reaction sites), thereby providing the advantage of continuous synthesis for the array of reaction sites. A further advantage is that polymers of different lengths can be synthesized continuously and simultaneously in the array of reaction sites because reaction sites for each of the different polymers can complete a different number of laps through the system and the reaction sites can be removed or added to the system in an independent fashion such that reactions occurring at other sites are not perturbed.

In one embodiment, the system includes a circular plate that is configured to hold a plurality of reaction sites along its outer edge. Distributed around the outer edge of the circular plate are also a series of stations, where each station is configured to take a particular action relating to the polymer synthesis process. As the circular plate rotates, reaction sites move in a circular pattern along the outer edge of the plate. The stations located around the outer perimeter are placed so that each station can act upon the reaction plates as they pass below the station. In one embodiment, the reaction site passes under a station configured to dispense a reaction solution to the reaction site. A computer control system is programmed to determine the proper solution to dispense within each reaction site, and to coordinate the movement of the circular plate with the position of the station. Other stations within the device are configured to gather images of the reaction sites or to add or remove reaction sites.

A synthesizer of the present embodiments can be configured for calibrated solution delivery. An array of reaction sites, such as an array of multiwell plates, can be attached to a rigid carrier such as a circular table or other stage. The carrier is typically sufficiently rigid that the location of each reaction site relative to others in the array does not change substantially during the course of typical synthesizer operation. An optical sensor can be placed at each of the dispensing stations allowing the positions of the multi-well plate on the rigid carrier to be determined for each of the dispensers. This allows multi-well plate-specific optimization of the dispense timing thereby compensating for positional tolerances of the dispensers relative to the reaction sites. For example, the position of each multi-well plate on a circular table can be determined such that timing of dispenser firing can be correlated with rotation of the plate for accurate delivery of reagents to the individual wells. So long as the relative positions of the reaction sites are not substantially altered, calibration is only required following assembly of the synthesizer, one or more of its dispensing stations, or the rigid carrier. In addition, the learned position data can be saved to a file and does not need to be changed unless some disassembly of the machine occurs.

As will be described in detail below, embodiments of the system provide for dispensing reaction solutions as an array of reaction sites is moving. For example, as a reaction site approaches a reaction station, the computer control system determines the proper time to dispense the reaction solution, and then instructs the dispensing station to dispense the solution at the proper moment the reaction site is passing below a dispensing valve within the dispensing station. Of course, it should be realized that a dispensing station may be configured to dispense a plurality of solutions from separate valves to a plurality of moving reaction sites. For example, the reaction sites may be wells of a conventional microtiter plate, and the dispensing station may be configured to dispense reaction solutions to the wells of an entire row or column of the microtiter plate at the same time or in fast succession. In particular embodiments, a linear arrangement of valves can be instructed by the computer control system to dispense reagents sequentially and in a way that coincides with the arcuate trajectory of the microtiter plate.

A synthesizer of the present embodiments can further include dispensing nozzles having localized reservoirs. Reagents for a synthetic reaction can be maintained in large storage tanks that are in fluid contact with appropriate dispensing nozzles. The local reservoirs allow rapid delivery of reagents and replacement of bulk reagents in the large storage tanks during the course of continuous synthesis.

Another embodiment relates to an imaging system that is configured to take a digital image of reaction sites after a reaction solution has been dispensed or removed, and then process that image to determine if reaction solutions were dispensed to or removed from the appropriate sites. If a quality control module within the system determines that a particular site did not properly receive or evacuate a reaction solution, it can be marked with an error flag to indicate that further steps of the reaction at that site should be discontinued or that the reaction site should be removed from the system. An advantage of the imaging stations is that they can provide real-time confirmation that the upstream dispensers are functional and that evacuation of the plates was successful, resulting in the ability to pause the synthesis cycle and conduct maintenance without sacrificing downstream reactions.

In one embodiment, the system includes a series of dispensing stations around the circumference of the device, and proximal to one or more of the dispensing stations is a digital camera that is configured to take an image of the reaction sites after a reaction solution has been dispensed into the reaction vessel.

It should be realized that not every reaction site need receive a reaction solution at every reaction station. Thus, the imaging system is preferably programmed to determine whether a particular reaction site was supposed to have received a reaction solution, and if so, then determine if the reaction site has such a solution within the vessel.

A system of the present embodiments can further include a continuously available solution removal device. Thus, removal of reaction solutions need not be confined to occurring only at a particular station. Rather removal of a reaction solution can occur at any time during a synthetic reaction sequence or at any location along a path traversed by a reaction site in a system of the present embodiments. In particular embodiments, a valve attenuated vacuum evacuation device is available to individual multi-well plates in an array of multi-well plates at all times during a synthetic reaction.

A system of the present embodiments can further include a gas knife for providing a flow of inert gas over the reaction sites. In particular embodiments, the gas knife can be maintained over each site at all times during a synthesis reaction. A device can be used to supply a rectangular jet of inert gas, either laminar or turbulent, that is blown tangentially over the upper surface of a multi-well plate or other reaction site. The device can be further configured such that the gas knife travels with each of the multiwell plates as they move along a synthesis path. A gas knife can provide the advantage of reducing contamination between reaction sites by removing volatile reagents or solvents that have entered the vapor phase. It can also protect each reaction site from unwanted vapors generated by dispense stations.

In one embodiment, a system provided by the present embodiments includes an oligonucleotide synthesizer having a circular array of reaction sites. In this embodiment, each time the array of reaction sites completes a rotation, one nucleotide base is added to the oligonucleotide at each site. In this embodiment, there may be a plurality of reaction solution dispensing stations, wherein a first station dispenses adenosine, a second station dispenses thymidine, a third station dispenses cytidine and a fourth station dispenses guanosine. In addition, other dispensing stations located along the outer perimeter of the circular array can be configured to dispense other reaction solutions that are necessary in order to synthesize oligonucleotides. For example, the dispensing stations can dispense reaction solutions for detrytilation, coupling, capping and oxidation, in accordance with the steps for synthesizing an oligonucleotide chain.

Other embodiments provide a system that synthesizes other polymeric molecules. For example, the synthesizer can be configured to dispense reaction solutions that will synthesize polypeptides. The process of peptide synthesis on solid supports generally involves building a peptide from the carboxyl-terminal end. The peptide is attached to a solid support via its carboxy-terminal amino acid and further includes a protecting group on the amino-terminal α-amino group. The protecting group is then cleaved off of the peptide to form a deprotected peptide. Next a monomeric amino acid, also containing an α-amino protecting group, is contacted with the de-protected peptide under conditions for formation of a peptide bond between the α-amino group of the deprotected peptide and the α-carboxy group the monomeric amino acid. The monomeric amino acid can be provided in an activated form or an activating reagent can be added to the amino acid and growing peptide. Washes can be carried out between steps to remove reagents. The cycle of deprotecting the prior amino acid and coupling the additional amino acid can be repeated until a peptide of the desired length is synthesized. Any reactive side chains of the amino acids are typically protected by chemical groups that can withstand the coupling and α-amino deprotection procedure. These side chain protecting groups, however, can be removed at the end of the synthesis. Accordingly, each dispenser of a synthesizer of the present embodiments can be configured to dispense a wash solution, deprotection reagent, amino acid, or activation reagent. The relative placement of the array of stations, relative placement of the array of reaction sites and the schedule by which the arrays communicate with each other can be correlated in accordance with the teachings herein and the known reaction schemes for peptide synthesis including, for example, those described in Goodman et al. (Eds.). *Synthesis of Peptides and Peptidomimetics,* Vol. E22a. Georg Thieme Verlag, Stuttgart (2002).

Overview of Particular Synthesizer Embodiments

FIG. 1 is a diagram of one embodiment of a continuous polymer synthesizer 10. As shown, the synthesizer 10 includes a hexagonal base 15 which supports a rotary table 20. The rotary table 20 is disposed within the base 10 such that it can be actuated to rotate about a central axis. Located around the outer edge of the rotary table 20 are a series of plate modules 500, each of which is configured to mount with a plate holder (not shown) that is designed to hold a multi-well plate. This configuration is explained in more detail below.

Of course, it should be realized that embodiments are not limited to any particular configuration of plate holder or multi-well plate. For example, any type of reaction site that is used within the continuous polymer synthesizer is within the scope of the present embodiments. Such reaction sites include, for example, wells of a multiwell plate such as a microtiter plate or filter bottom plate, Eppendorf tubes, substrates for microarrays such as silicon chips or glass slides, and any of a variety of known substrates or containers for holding reaction solutions. Those skilled in the art will recognize that embodiments exemplified herein with regard to microtiter plates can be readily adapted to other reaction sites.

For purposes of illustration, the present embodiments are exemplified herein with respect to the use of a rotary table as a stage that supports an array of reaction sites that move along a circular path. However, other stages or configurations are also useful so long as they are capable of continuous synthesis in accordance with the present embodiments set forth herein. For example, a stage can move reaction sites in a path having a linear shape or a curved shape that corresponds to all or a portion of a circle, ellipse or other shape. Typically, a stage used in the present embodiments is configured to accept an array of reaction sites such that the sites are placed in a fixed order and fixed intervals relative to each other. Thus, the array of reaction sites can be moved such that the relative positions of the reaction sites in the array are not altered. However, if desired a stage used in the present embodiments can be configured to allow movement of individual reaction sites such that the relative positions of the sites in the array can be altered. Furthermore, a stage need not move and can be static, for example, in embodiments where an array of stations is moved instead.

As used herein, the term "continuous," when used in reference to synthesis of a plurality of molecules, means that the order of steps and time interval between steps for synthesis of each molecule occurs according to a reaction schedule and the schedule is unaltered by manipulations occurring for the other molecules. The manipulations can include steps occurring according to a reaction schedule; steps utilized to initiate or terminate a synthetic reaction, such as addition of a reaction vessel to a synthetic device or removal of a reaction vessel from a synthetic device; passive steps such as maintaining reagents at a reaction site during an incubation step; or steps that differ from a reaction schedule such as premature removal of a reaction vessel for a failed synthetic reaction. Thus, even in the presence of an error requiring replacement of a reaction vessel, a system that continuously synthesizes a plurality of molecules can process reactions for the other molecules in an uninterrupted fashion. Continuous synthesis should not be interpreted to require continuous movement of any part of a system of the present embodiments. A continuous synthesizer may, for example, stop moving as a rotary table changes direction and may do so while continuous synthesis occurs at multi-well plates on the rotary table.

Accordingly, the present embodiments provide systems and methods wherein an array of reaction sites or an array of stations move on a schedule for sequential communication of the reaction sites with the stations, wherein the relative locations of the stations and the schedule correlate with the order and duration of the sequential steps of a particular reaction. As used herein, the term "steps of a reaction" means manipulations carried out or allowed to occur for a chemical transformation or change. The term "reaction schedule" means a pre-defined order and duration of manipulations to be carried out for a chemical transformation or change.

Returning to the exemplary synthesizer of FIG. 1, as the rotary table 20 rotates within the base 15, the plate modules 500, which include plate holders (not shown) that are removably mounted to the rotary table 20, also rotate along the outer circumference of the rotary table 20. Fixed in position, and mounted to the top of the synthesizer 10 are a series of dispensers 35A-F and cameras 38A-E. This will be described more completely with reference to FIG. 2. It should be noted that as the rotary table 20 moves about its central axis, each of the plate modules 500 progressively move beneath the dispensers, also termed "dispensing stations" so that reaction solutions can be dispensed into the microtiter plates. In one embodiment, the reaction solutions are dispensed by dispensing valves into the microtiter plates as the rotary table 20 is moving. The dispensing valves are also termed "dispensing nozzles" and are typically static, whereby they do not move relative to the dispensers during the course of reagent delivery in a synthetic cycle.

In the embodiment shown in FIG. 1, a feedback mechanism can be used that determines the position of the rotary table in relation to the dispenser valves. Such a determination can be made continually throughout operation or at specific times such as following an adjustment made to the system. In one embodiment, a sensor is used that determines the position of a fiducial on a microtiter plate or other reaction site. Once the sensor has determined the position of the rotary table, this location information is fed back to the system that controls the rotor and the timing of the valves in the dispenser nozzles. In one embodiment, the fiducial is a plastic structure, such as a rib or edge of a well, in the microtiter plate. Additionally or alternatively, a detectable device or material can be temporarily used in place of a reaction site, for example, being temporarily placed in a plate module on rotary table 20 during a calibration step.

In one embodiment, the rotary table 20 is configured to have a diameter that is large enough so that the plate modules located along the outer circumference of the table follow an almost linear trajectory as they pass under each dispenser. For example, the rotary table shown in FIG. 2 may have a diameter of about 77" such that the microtiter plates located on the outer edge of the table follow a circular path that approximates the circumference of the table. As the diameter of the table increases, the path of the plates along the edge of the table become more apparently linear with the increase in circumference. Accordingly, the diameter of a rotary table used in the present embodiments can be selected from sizes including at least about 77", 80", 85", 90", 100" or larger. It will be understood that smaller diameters can also be used, for example, in cases where fewer reaction sites are to be used, the diameter of a rotary table can be at least about 60", 54", 48", 42" or 36" or smaller. In embodiments wherein the reaction sites are not placed on the outer edge of the rotary table, those skilled in the art will recognize that the diameters exemplified above, and the corresponding circumferences, can apply to the dimensions of the circular path of the reaction sites.

Figure 2:
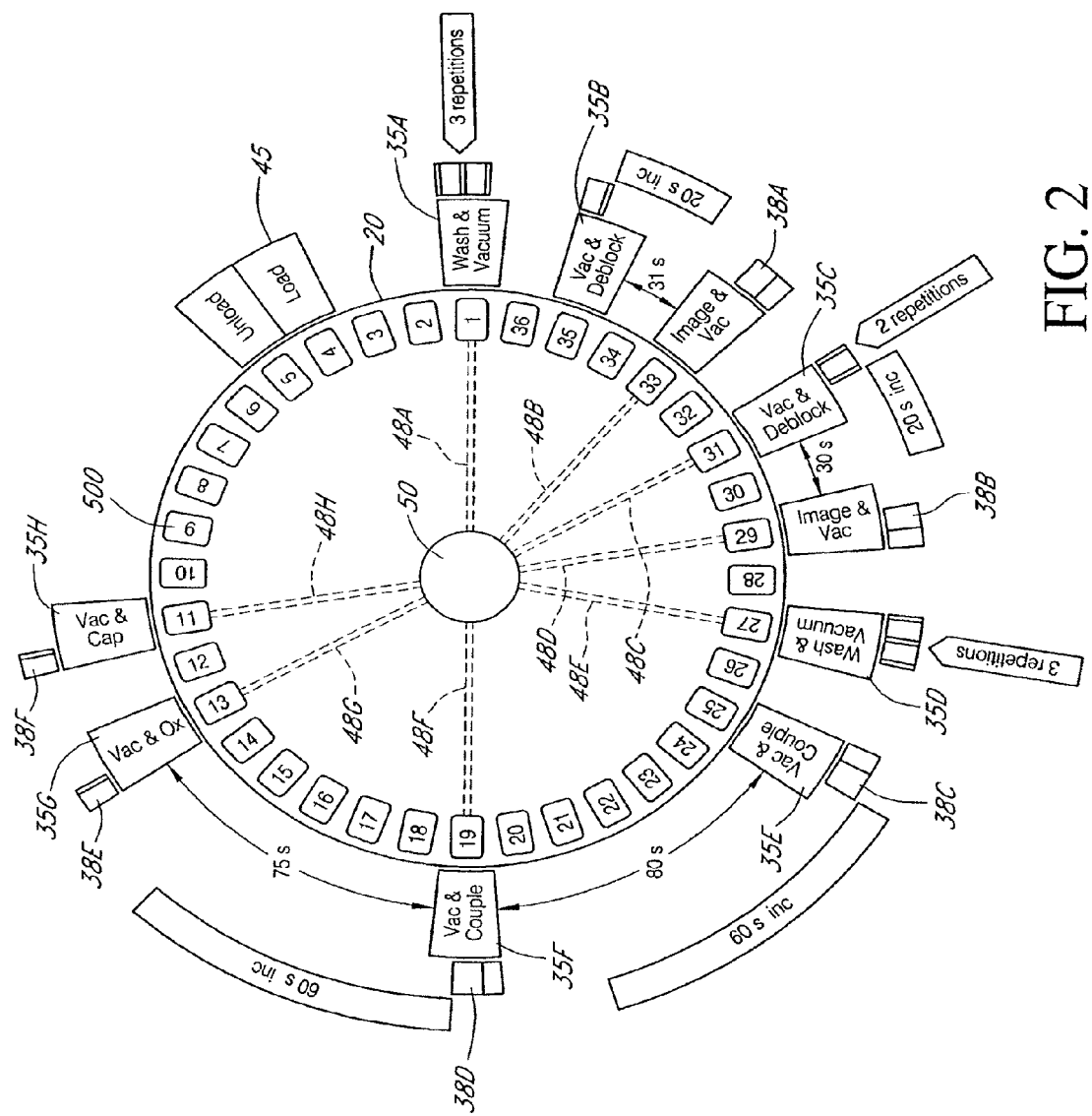
FIG. 2 is a schematic diagram of the array of stations within the continuous oligonucleotide synthesizer of FIG. 1.

The exemplary system shown in FIGS. 1 and 2 moves in a net clockwise direction. However, the system can be configured to move in a counterclockwise direction as well. For example, reaction solutions can be dispensed into a microtiter plate from a particular dispensing station while the rotary table moves in a clockwise direction. The direction of movement for the rotary table can then be changed from clockwise to counterclockwise direction. The counterclockwise distance traveled by the table can be such that the microtiter plate is placed in position to be imaged by one of the imaging stations 38A-E. The direction of the rotary table can again be changed whereby the microtiter plate that was imaged is moved in a clockwise direction past the particular dispensing station to the next dispensing station. The movement of the rotary table, although changing directions several times, occurs such that the net movement is in a clockwise direction. Furthermore, continuous synthesis occurs at each microtiter plate (numbered 1 through 36 in FIG. 2) because the movement of the table and placement of the stations allows all microtiter plates to receive reactants and incubate the reactants according the reaction scheme shown in FIG. 4.

It will be understood that a system of the present embodiments whether using a rotary table or other stage for accepting an array of reaction sites can move in two directions as exemplified above or in a single direction as desired to suit a particular application of the system. Accordingly, an imaging station can be placed such that it is either before or after a particular dispensing station in the net path of movement for a system. An imaging station can be placed relative to the location of one or more of the dispensing stations and relative to the movement of the system so that an image of each reaction site can be taken after one or more reaction solutions has been dispensed. Particular embodiments of imaging stations useful in the present embodiments will be described in more detail below.

It should be realized that image processing software running on an image processing system can be configured to receive a copy of an image and thereafter determine if the proper solution was actually dispensed in each reaction vessel. In one embodiment, the image processing system determines if one or more of the wells in a microtiter plate is full or empty. In another embodiment, the image processing system can determine the absorbance properties of the reaction solution within each well such as the wavelength of light absorbed or the optical density at one or more wavelength. The absorbance properties of a reaction solution in a well can be used to determine yield of a colorimetric reaction using methods set forth elsewhere herein or known in the art as described, for example, in US Pat. App. Pub. No. 2004/0219063. If the image processing software determines that the dispenser did not properly add a reaction solution to a particular well of the microtiter plate or that a desired level of color is not present, then that well or the plate containing that well can be flagged as bad within a laboratory information management (LIMS) system that monitors the progress of the synthesis reactions occurring within the continuous synthesizer 10.

Those skilled in the art will recognize that an imaging station useful in the present embodiments can be configured to detect any of a variety of detectable characteristics of a reaction site such as an optical property including, without limitation, absorbance, fluorescence, chemiluminescence, polarization, circular dichroism, fluorescence resonance energy transfer (FRET), light scattering or the like. Furthermore, those skilled in the art will readily recognize that an optical detection device, such as those set forth herein can be modified or replaced with any of a variety of known detection devices appropriate for monitoring such optical properties. Further still, the present embodiments can be used to detect changes in optical properties that occur in one or more range of the electromagnetic spectrum including, without limitation, infrared, visible, ultraviolet, x-ray, microwave, sub-regions thereof such as red, blue or yellow sub-regions of the visible region, combinations of these regions or sub-regions, or other regions of the spectrum.

An imaging station useful in the present embodiments can include a camera device such as a charge couple device (CCD) camera of the type including, but not limited to, the AXIS 2100 Network Camera provided by AXIS Communications, Inc. of Lund, Sweden. One should appreciate that other types of cameras may be used in accordance with the present embodiments. A camera used in the present embodiments can be any device that converts a detectable optical property into a signal in a location dependent manner. Thus, exemplary cameras useful in the present embodiments include, for example, complementary metal oxide semiconductor (CMOS) camera, video camera, internet camera, or other imaging device capable of converting a picture into a digital image. Other imaging devices known in the art can also be used including, for example, those described in US Pat. App. Pub. No. 2004/0219063.

As set forth above, the present embodiments include a synthesizer that is capable of continuing to synthesize polymers within a multi-well plate, even if one well within that plate has been determined to be bad. For example, if the imaging system determines that one well of a multi-well plate did not have a reaction solution added to it, then the entire multi-well plate need not be marked as bad. Rather the specific well can be indicated as a failed synthesis. Thus, the system can continue to deliver solutions to other wells of the multi-well plate in order to synthesize polymers therein while delivery of solutions to the failed well is discontinued to avoid waste of reagents. Furthermore, it will be understood that the synthesizer can continue to synthesize polymers within other multi-well plates, even if one of the plates within the array of plates is identified as a failed plate because synthesis at the failed plate can be selectively discontinued or the failed plate can be selectively removed from the rotary table without perturbing delivery or incubation of reagents at the other plates.

FIG. 2 is a schematic diagram of the rotary table 20 and dispensing stations 35A-F and imaging stations 38A-F useful in the present embodiments. As shown, a load station 45 exists which is configured to allow plate holders to be loaded onto plate modules 500 on the synthesizer 10. A load station can be configured for both loading and unloading of a multi-well plate or other reaction site or, alternatively, separate stations can be used for loading and unloading of a reaction site from the system. The plate modules and their associated plate holders will be explained more specifically with reference to FIGS. 5A-D. It should be realized that plate holders, each of which support a microtiter plate, can be loaded onto the synthesizer 10 either manually or using an automated handling device such as a robotic arm. In addition, a unique bar code can be assigned to each microtiter plate so that each plate can be automatically tracked from the time it is placed onto the synthesizer 10 until it is removed. A computer control system, as will be described hereinafter can monitor the progress of each microtiter plate as it moves onto and off the rotary plate, and thereby keep control over the reactions that are being carried out by the synthesizer at any one time. In one embodiment, a bar code scanner is associated with the automated handling device such that each plate which is loaded or unloaded from the synthesizer 10 is scanned and tracked within a LIMS.

As shown in FIG. 2, the synthesizer 10 can be configured to manufacture oligonucleotides within microtiter plates or other multi-reaction site substrate. Each well of the microtiter plate is assigned a different oligonucleotide to be synthesized based on predetermined requirements. Based on this assignment, a LIMS, as described below, instructs each dispenser to output the proper reaction solutions into the proper well. Each dispenser includes one or more valves, each of which is configured to accurately dispense reaction solutions into a microtiter well.

Figure 8:
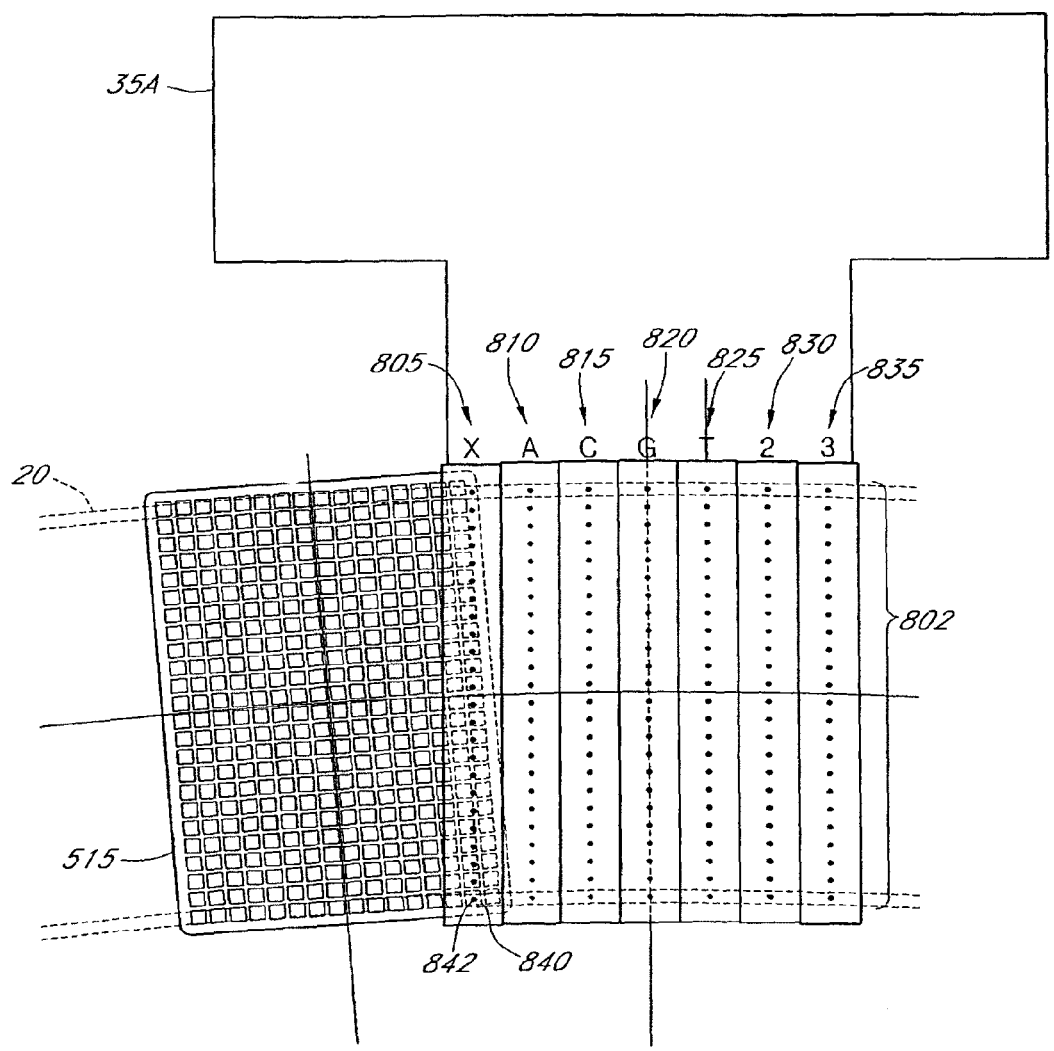
FIG. 8 is a schematic diagram of one embodiment of the trajectory of a microtiter plate passing under a dispenser nozzle that delivers reaction solutions into the microtiter plate.

Once a plate holder is loaded onto a plate module 500 on the rotary table 20, the plate module enters below the wash station dispenser 35A. As the plate module enters below the dispenser 35A, the valves within the dispenser 35A output a wash solution into the microtiter wells. In one embodiment, the dispenser includes 24 individually controlled valves which are configured to dispense wash solution into 24 wells of a microtiter plate. As shown in FIG. 8, the dispensing nozzles can be configured to match the pattern of wells in one or more rows or columns of a 384 well microtiter plate 515. As the microtiter plate passes below the wash dispenser 35A, each valve is timed to release a predetermined quantity of wash solution into each well of the microtiter plate. In one embodiment, the wash solution is an acetonitrile (ACN) wash solution. The number of dispensing nozzles utilized at a wash station or other solution dispensing station can be fewer than the number of reaction sites. By way of illustration, the system exemplified above as having 24 valves can deliver solution to all of the 384 wells of the microtiter plate if each of the 24 valves fires 16 times, thereby filling all 16 rows of the microtiter plate. Thus, a dispensing station can have a single linear arrangement of valves, for example, corresponding to a single row or column of a microtiter plate, or multiple linear arrangements of valves that form a matrix of rows and columns corresponding to all or a portion of the wells in a microtiter plate.

After a wash solution is dispensed into each well, and it has been allowed to incubate for a desired time, the solution can be removed using a solution removal device such as a vacuum source. In one embodiment, the vacuum source is in continuous communication with the plate modules as the rotary table rotates. A valve can be placed between the vacuum source and plate for attenuated communication between the vacuum source and the plate. The vacuum acts as a solution removal device to remove solutions from the microtiter plate. In this embodiment, the microtiter plate is a "filter bottom" type plate wherein the bottom of the microtiter plate is liquid permeable. Filter bottom microtiter plates are available, for example, from Innovative Microplate (Chicopee, Mass.—innovativemicroplate.com). Typically, a growing oligonucleotide is covalently attached to the well or to a solid substrate such that it does not pass through the filter. Thus, the growing oligonucleotide is retained in the well upon application of a vacuum. Those skilled in the art will recognize that other substrates having reaction sites capable of vacuum evacuation, such as filter disks or chips, can similarly be used in the present embodiments.

In the above-described embodiments, a single vacuum source can be connected to the multi-well plates. For example, a vacuum pump can be placed at a location away from the rotary table and in communication with the plates via a rotary union with an electrical slip ring. As shown in FIG. 2, a series of vacuum lines 48A-G can run from a central orifice 50 of the rotary table 20 and connect to each plate module 500. For illustrative purposes, only a subset of the vacuum lines are shown in FIG. 2, but it will be understood that each of the multi-well plates of the array can be in communication with a vacuum source via a vacuum line. The rotary union allows a vacuum line to communicate with each of the multiwell plates and to travel with each of the multiwell plates while the rotor is moving and while the vacuum source is maintained at a static location.

In particular embodiments, the vacuum supply to each multi-well plate can be controlled by separate valves. For example, an electrical slip ring of the rotary union can contain a series of electrical circuits whose contacts move relative to one another but maintain continuity as the device rotates, thereby allowing operating solenoids to travel with each of the multi-well plates. By connecting a solenoid valve to each of the moving plates, the vacuum to each plate can be turned on or off by the system at any time during the synthesis cycle. This configuration provides the advantage of keeping the instrument compact, minimizing mechanical complexity and contributing to high reliability. Further description of plate modules and configurations of the plate modules relating to interaction with a vacuum source and multiwell plate are set forth below.

It should be realized that prior to evacuation of the ACN wash, an image of the multi-well plate can be taken by one of the digital camera devices, and thereafter sent for processing to the image processing system. The image processing system can analyze the image, as discussed below, to determine if each well of the microtiter plate was properly treated with a wash. If a well is not found to have a wash solution, then that well can be marked as bad, or can be marked to be treated with an additional wash at a later cycle. The image processing system can be used in a similar fashion to determine if solution has been sufficiently removed from a multi-well plate based on an image acquired after an evacuation step.

Following the wash step, the plate modules can move to a position under the deblock dispenser 35B. This dispenser is configured to dispense a deblocking solution containing, in one embodiment, trichloroacetic acid that reacts with the growing oligonucleotide to remove a dimethoxytrityl (DMT) group from the last nucleotide. Removal of the DMT group from an oligonucleotide allows the addition of a subsequent nucleotide to the growing polymer chain. The release of DMT is readily identifiable by a bright orange color that can be imaged by one of the cameras of the system. Accordingly, once the deblocking step has occurred, the plate module can rotate under another camera which images the reaction sites and thereby determines whether the deblocking step was successful by measuring whether each reaction solution has a bright orange color. The optical density of the orange color at each reaction site can be determined from the image and used to evaluate coupling efficiency, yield or other characteristics for each individual synthetic reaction. The plate module can then be evacuated to remove the deblocking solution.

The plate module can then be moved under a washing dispenser 35D which is configured to wash any additional deblocking solution from each well. The system can take an image after the addition of a wash solution to determine whether or not each well received the washing solution and thereafter the wash solution can be evacuated from each well. Acetonitrile (ACN), an inert solvent, is used for this and other wash solutions in the protocol in one embodiment.

After being washed at the dispenser 35D, the plate module travels under the coupling dispenser 35E wherein the appropriate nucleotide is added to each of the wells. As can be imagined, if the next nucleotide in an oligonucleotide is an "A", then the dispenser 35E would dispense a solution of adenosine into the well. The dispenser 35E is configured to dispense the proper nucleotide into each of the wells of the microtiter plate within the plate module. Of course, the system can be configured so that there are multiple dispensers, wherein each dispenser is configured to provide a different nucleotide to each well. Furthermore, a system of the present embodiments can include one or more dispensing stations that are configured to deliver modified nucleotides. Separate stations or dispensing nozzles can be used to deliver modified nucleotides in a dedicated fashion. Alternatively, a station or dispensing nozzle can be configured to deliver a plurality of different nucleotides, 2 or more nucleotides having naturally occurring bases of A, T, C, G or U, or modified a version of these and other nucleotides.

Following delivery from the coupling dispenser 35D, the plate module can pass under another camera that takes an image of the microtiter plate to ensure that a nucleotide solution has been administered to appropriate wells. The liquid contents of the plate can then be evacuated, whereby the nucleotide solution is removed from the growing polymer.

The plate module can then move to an oxidation dispenser 35G. This dispenser disperses an oxidation reaction solution, containing iodine, into appropriate wells as the next step in the reaction process. This solution can then be imaged and evacuated, and the plate module moved to a cap dispenser 35H for the final stage in the oligonucleotide synthesis reaction. Once the cap solution, which contains acetic anhydride activated with N-methylimidazole, is dispensed into appropriate wells, the plate can continue on its circular path. If the reaction is completed, then the plate module can be removed at the load/unload station 45 located just after the cap dispenser 35H. If synthesis of oligonucleotides in the plate is not complete, the plate module can make a further lap under the array of dispensing stations for addition of another nucleotide to the growing oligonucleotides in the multi-well plates.

Those skilled in the art will recognize that the order by which the microtiter plate communicates with different stations set forth above is provided for purposes of illustration. The order in which a reaction site communicates with separate stations, direction of relative movement between a reaction site and array of stations, and duration between reaction site manipulations can be selected to suit a particular reaction or application of the present embodiments and can, therefore, differ from that exemplified above.

Accordingly, one embodiment is a system for continuously synthesizing molecules, whereby the molecules are synthesized by performing sequential steps of a reaction. In one embodiment the molecules are oligonucleotides or polypeptides. In this embodiment, the system includes a stage configured to accept an array of reaction sites. A reaction site may be, for example, a filter bottom microtiter plate, a tube, or any other means for holding reaction solutions. The system also includes an array of different stations. One set of stations are reagent dispensing stations, such as the dispensers 35. These stations are configured to separately and sequentially provide synthesis reaction solutions to the reaction sites for carrying out the sequential reaction steps. In addition, the array of stations can be configured in a fixed spatial relationship corresponding to the order of the sequential steps of the reaction Another set of stations that can be included in an array of stations includes imaging stations that are configured to obtain images of the reaction sites either after reactions solutions have been dispensed, or after the solutions have been evacuated. The system can also include a control system, as discussed below, that is configured to move the stage or the array of stations so that the reaction sites sequentially communicate with the dispensing stations and the imaging stations. This allows the dispensing stations to dispense reaction solutions to the sites, and the imaging stations to image the sites. In one embodiment, the control system is further configured to allow replacement of a first reaction site, such as a microtiter plate, from the array of reaction sites with a second reaction site while the system continuously synthesizes molecules at other reaction sites of the array of reaction sites.

It should also be realized that the system can also monitor the quality or yield of a synthesis reaction, and not just whether or not the reaction has occurred. For example, the continuous synthesizer can be configured for use in monitoring parallel chemical reactions and is particularly suited for real-time monitoring of polymer synthesis such as oligonucleotide synthesis or peptide synthesis. The synthesizer is also particularly suited for providing a quality control (QC) measure for oligonucleotide, peptide or other polymer productions. In one embodiment, the chemical reaction monitor is an automated DMT monitoring system used to track the yield, quality and general state of oligonucleotides being synthesized at any one time. Although the present embodiments are exemplified herein in the context of oligonucleotide synthesis one should appreciate that the chemical reaction monitor of the present embodiments is not limited to oligonucleotide synthesis and may be used in the monitoring of other types of chemical reactions. Further examples of methods for detecting the quality of a synthesis reaction can be found in WO 04/065000 and US Pat. App. Pub. No. 2004/0219063, the entireties of which are hereby incorporated by reference.

A method or system of the present embodiments can be used for simultaneous synthesis of a large number of reactions. For example, the system exemplified in FIG. 2 includes 36 plates each having 96 or 384 wells, thereby being capable of simultaneously carrying out 3,456 or 13,828 individual reactions, respectively, at any given time. Those skilled in the art will recognize that the system can be configured to carry out larger numbers of simultaneous reactions, for example, by increasing the number of multi-well plates used or the number of wells in each plate or both. Similarly, a system of the present embodiments can be configured to carry out fewer simultaneous reactions, for example, by using fewer multi-well plates or fewer wells per plate. Accordingly, a system or method of the present embodiments can be configured for continuously carrying out at least about 100, $1 \times 10^3$, $1 \times 10^4$, $1 \times 10^5$ or $1 \times 10^6$ reactions simultaneously.

Continuous synthesis using a system or method of the present embodiments provides for high-throughput production of desired products. For example, the system exemplified in FIG. 2 can operate at a rate that allows each 384-well plate to complete one lap in 9 minutes. However, because the system is continuously performing nucleotide addition reactions in 36 plates, the system will complete 13,824 (=384×36) nucleotide addition reactions in 9 minutes. This works out to 92,160 nucleotide addition reactions completed per hour. Depending upon the reaction conditions selected, the present embodiments can be used to complete a synthetic cycle, such as addition of monomeric units to growing polymer, in at least about 1, 5, 7, 8, 9, 10, 11, 12, 15, 20, 30, or 60 minutes. This rate of synthesis can apply to any of a variety of numbers of reaction sites, such as those exemplified above. Generally, throughput using the present embodiments, depending upon reaction conditions selected, can be, for example, at least about 100, 500, $1\times10^3$, $5\times10^3$, $1\times10^4$, $5\times10^4$, $1\times10^5$, $5\times10^5$ or $1\times10^6$ reactions or reaction cycles completed per hour.

Exemplary Continuous Polymer Synthesis System

Figure 3:
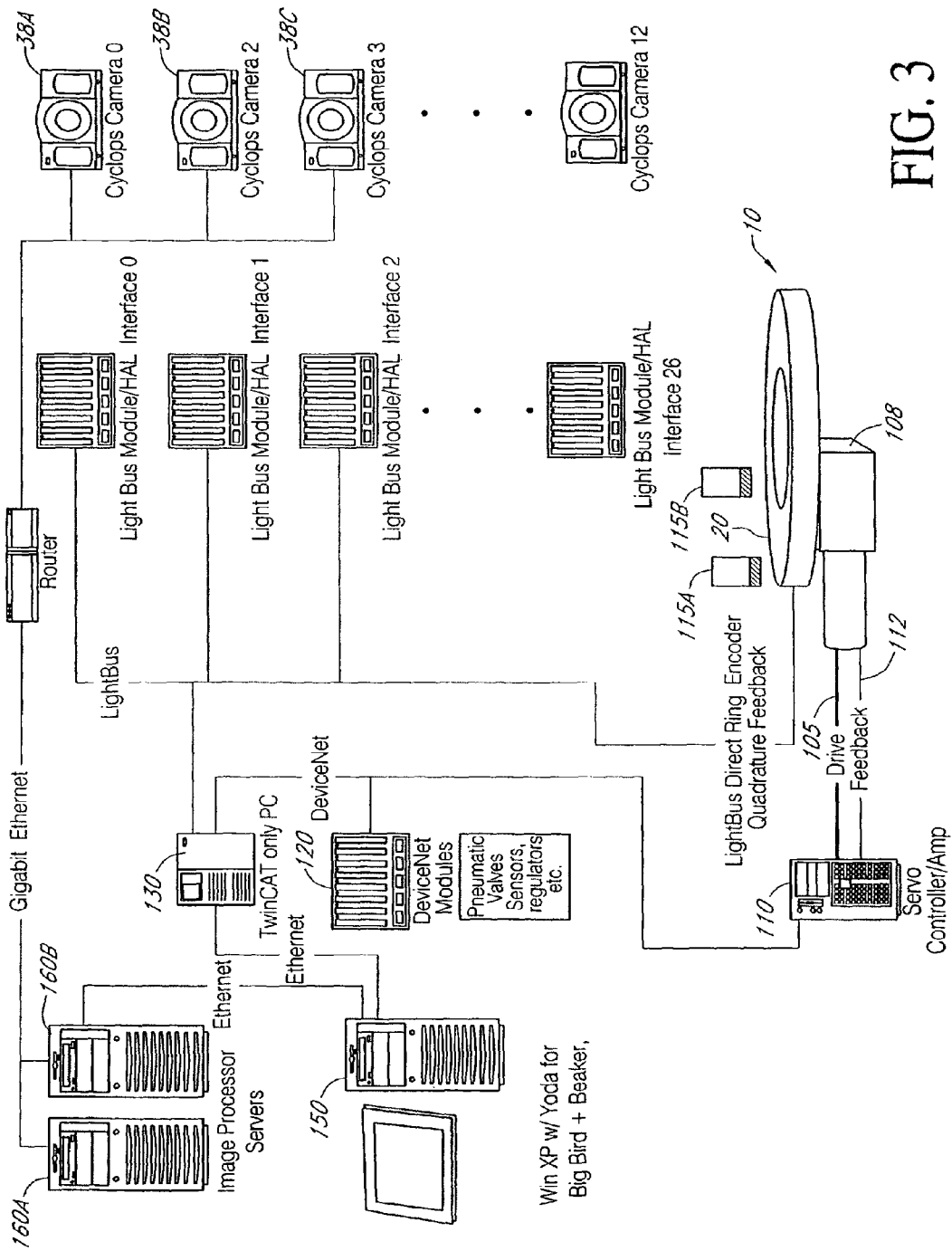
FIG. 3 is a block diagram of one embodiment of a system for continuously synthesizing polymeric molecules.

FIG. 3 is a block diagram of an exemplary continuous polymer synthesis system 100 that includes the continuous synthesizer 10 linked through an electronic connection 105 to a servo controller system 110. The servo controller system 110 controls the servo 108 that is mounted below the rotary table 20 and controls the precise position of the rotary table 20 with respect to the dispensers and cameras.

A feedback line 112 keeps the servo controller system 110 in constant communication with the synthesizer 10 so that it maintains the position of the rotary table in real-time. A position sensor 115 detects the position of the microtiter plates as they move around the rotary table, and provides electronic feedback to the servo controller system 100. The servo controller system 110 provides instructions to the servo 108 to move the rotary table 20 to a particular position. In one embodiment, the sensor is a single beam sensor such as the Keyence LV-21A, LV-H35F sensor. The position sensor 115 is configured to read markings on the microtiter plates, or other portions of the rotary table, in order to confirm that the table moves to its expected position. Additionally, the position sensor 115 can provide feedback that is thereafter used by the servo control system 110 to mark the position of the plate relative to the position of the rotary table such that the microtiter plates become properly positioned under each dispenser. Those skilled in the art will recognize that a similar feedback system can be used to calibrate the positions of other reaction sites in a system of the present embodiments and can be readily adapted to embodiments wherein the array of reaction sites, the array of stations or both are capable of motion. Furthermore, the feedback system can be used continuously during operation of a system of the present embodiments or at particular times such as following synthesizer construction or maintenance.

Figure 6:
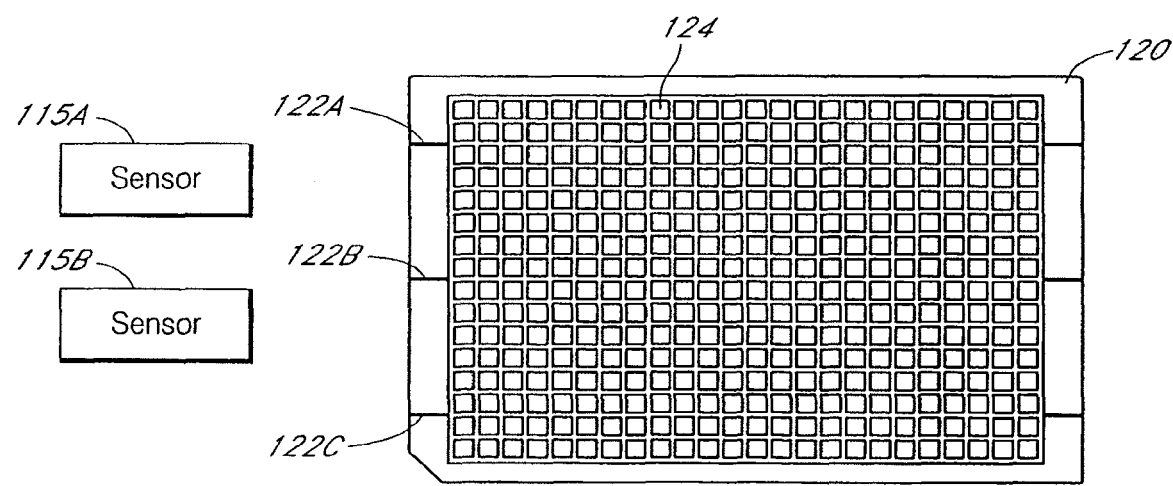
FIG. 6 is a top-view image of a microtiter plate that is used within the plate holder of FIG. 5B.

FIG. 6 provides an image of a microtiter plate 120 and shows a set of alignment ribs 122A, B and C. These ribs are standard structures within a microtiter plate 120, and are therefore at the same position relative to microtiter wells 124 within each microtiter plate in the system. Thus, sensors 115A,B can be used to determine the position of the microtiter plate, and thereby the wells, as they rotate around the synthesizer based on the location of the alignment ribs. Each sensor 115A,B can be configured to detect when one of the ribs passes by the sensor as the microtiter plate 120 moves on the rotary plate. This information can be used to send feedback signals though the feedback line 112 of FIG. 3. In cases where alignment is incorrect, appropriate instructions can be sent by the system to reagent delivery stations or to a human user to improve alignment between the microtiter plate and dispensing nozzles. Such alignment can include change in physical location or adjustment in the timing of solution delivery from one or more dispensing nozzles Referring back to FIG. 3, the controller 110 is linked to an embedded control layer (TwinCat 130) that includes a programmable soft PLC running on a Windows XP compatible PC architecture. This system provides deterministic control over the synthesizer hardware via the DeviceNet module 120 and LightBus control networks. The Soft PLC communicates with and controls the servo controller via the DeviceNet network.

The control system 150 contains software modules that communicate with the synthesizer 10 and provide instructions concerning which well to add a particular nucleotide into, and which well should be given a modified base. As can be understood, the control system 150 includes data representing the proper oligonucleotides to be manufactured by the synthesizer 10. These instructions are provided to the synthesizer 10 so that it can properly actuate the dispensers at the proper time as each well of a microtiter plate passes under a dispenser. This allows the system to manufacture different oligonucleotides within each well of a microtiter plate.

As set forth above, the control system 150 includes a storage device that stores oligonucleotide orders which specify the sequence of oligonucleotides to be manufactured. When a new plate is loaded onto the synthesizer 10, the control system notes the bar code number of that plate and then associates that bar code with a particular order stored within the control system. The selected plate is then assigned oligonucleotide sequences that are to be synthesized within each well. The control system tracks each microtiter plate on the synthesizer, and controls the nucleoside bases which are deposited into each well during synthesis. Thus, during one cycle around the synthesizer 10, some of the wells may receive a "C" base, whereas other wells may receive an "A", "T", "G" or specially modified base depending on the sequence of the oligonucleotide that is to be synthesized within each well.

Control system 150 can provide instructions to dispenser stations 35A-F via the TwinCat control layer in the form of a firing table that is derived from a correlation of desired nucleotide sequences with the synthesizer protocol. Nucleotide sequences can be imported into the control system in the form of batch files listing the sequence for the oligonucleotide to be synthesized in each well. Batch files can be obtained from a variety of sources including, for example, direct input from a user via a graphical user interface or via importation from a customer order system such as the oligonucleotide ordering systems described in U.S. Provisional App. No. 60/634,164, which is hereby incorporated by reference in its entirety.

Each well in a batch file can be identified according to a barcode for a particular plate and according to the location of the well in the plate (i.e. row and column). Using the example of the system shown in FIGS. 1 through 4, the synthesizer protocol includes the location of each multi-well plate 30 on the rotary table 20, the location of the dispenser stations 35A-F and the rotation schedule of the rotary table 20. For purposes of illustration, the schedule can be represented as a series of "tics", whereby each tic represents movement of the rotary table 20 a discrete distance. Accordingly, a different set of wells will pass under a dispensing station during each tic. For each tic, the control system provides a different firing table based on the identity of the wells and the sequences of the oligonucleotides to be synthesized in the wells.

Figure 10:
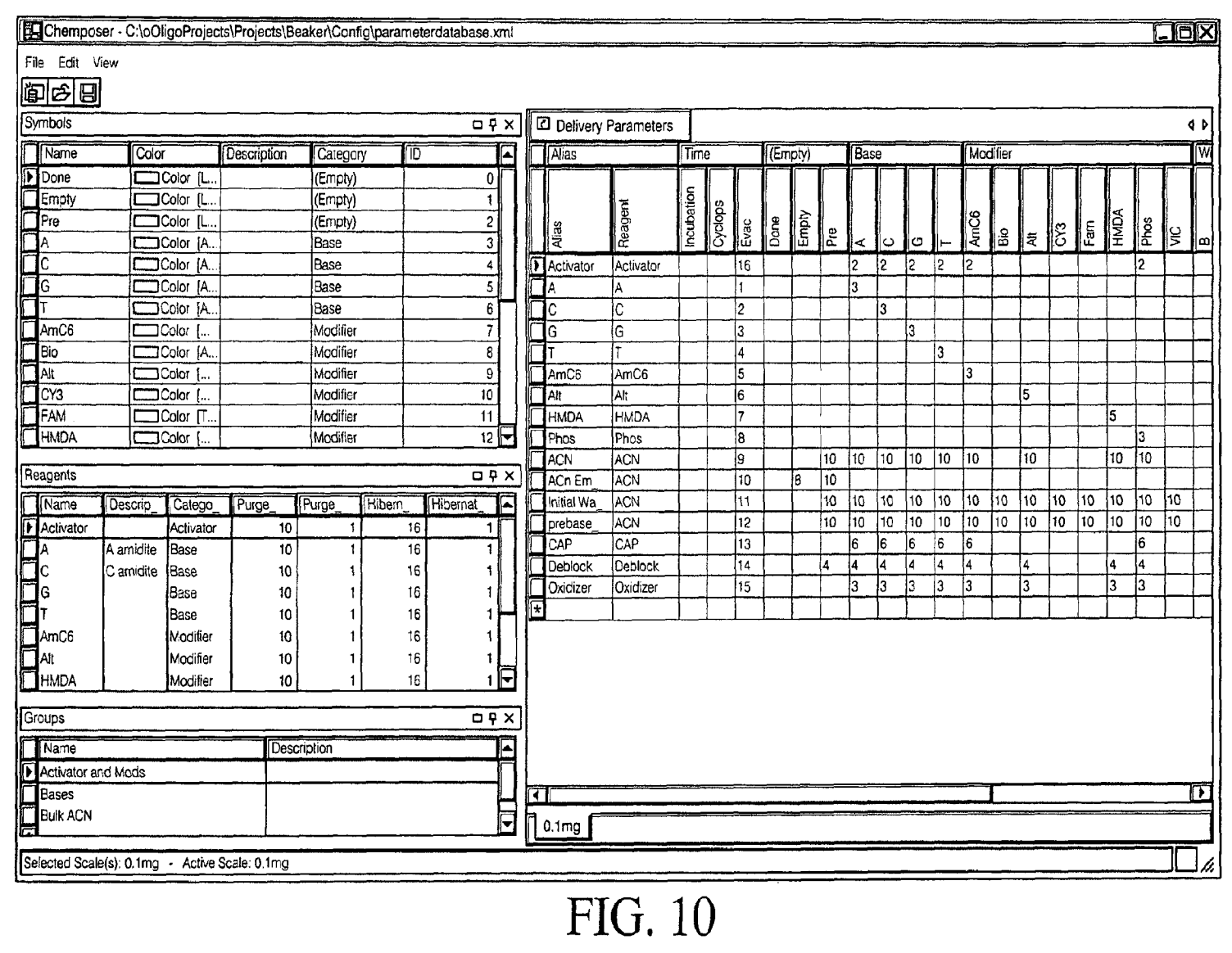

The firing table will be described in further detail with reference to the screen shot provided in FIG. 10. The screen shot represents a user interface for creating or modifying a firing table. In the screen shot and under the Delivery Parameters window, input options available for each well are listed in columns. The input options listed include activated nucleotides (A, C, T and G), modification reagents (AmC6, HMDA and Phos), wash solutions (ACN, ACN Em, initial wash, and prebase) and various other reaction solutions (CAP, Deblock and Oxidizer). Output reagents are listed in rows under the Delivery Parameters window. The numbers in the table correspond to the volumes of each reagent to be delivered by the output device to satisfy the input option selected.

Several of the input options have multiple output options and are therefore represented by aliases. An alias acts as a place holder representing several different sets of instructions, wherein each set is based on the specific reagents to be added for a particular synthesis cycle. For example, in a case where different initial wash treatments are used in connection with different modification steps, an alias for the initial wash step can represent a first set of instructions to be used in a synthesis cycle when a first modification reagent is to be used and a different set of instructions when a second modification is to be used. Thus, appropriate initial wash instructions can be included in a firing table based on the identification of a specific well and identification of the modification to be made to the oligonucleotide assigned to the well. The firing table can be sent to the initial wash dispenser 35A in response to the tic that brings the specific well into communication with dispenser 35A at the cycle in which the modification is to be made to the oligonucleotide.

Two or more input options can be organized into groups. Several groups are listed in the lower left window of the screen shot in FIG. 10 including Activator and Mods, Bases and Bulk ACN. As shown in the screenshot the Activator and Mods group is selected and includes the AmC6, HMDA and Phos input options. Organization of input options into groups provides the advantage of convenient construction or modification of firing tables. For example, a global change to be made for several input options can be readily made and/or visualized when the input options are organized into a group.

Those skilled in the art will know or be able to determine appropriate instructions for any of a variety of reactions based on the exemplary control system described above. For example, any of a variety of polymers or other products of repetitive reaction cycles can be synthesized using a firing table listing reactive solutions suitable for the particular reaction of interest. However while embodiments describe synthesizing polymers, aspects of the present embodiments also include assays such as determining the sequence of polymers. In one example, the sequence of DNA or proteins can be determined. Furthermore, the control system exemplified for a rotary table-based instrument can be readily adapted to other instruments such as those described elsewhere herein. Furthermore, instructions can be provided in other formats besides a firing table including for example, an electronic spreadsheet (for example, EXCEL™ spreadsheet from Microsoft) a database table or any of a variety of formats that can represent text in an electronic file.

As shown, the control system 150 is also linked to an image server 160A,B which is configured to process all of the images being captured by the cameras 38 mounted around the synthesizer 10. In one embodiment, each camera device is a charge couple device (CCD) camera of the type including, but not limited to, the AXIS 2100 Network Camera provided by AXIS Communications, Inc. of Lund Sweden. One should appreciate that other types of cameras may be used in accordance with the present embodiments. A camera used in the present embodiments can be any device that converts a detectable optical property into a signal in a location dependent manner. Thus, exemplary cameras useful in the present embodiments include, for example, a complementary metal oxide semiconductor (CMOS) camera, video camera, internet camera, or other imaging devices capable of converting a picture into a digital image such as those set forth previously herein and in U.S. Pat. App. Pub. No. 2004/0219063.

As discussed previously, each camera can be positioned on the synthesizer 10 over a multi-well plate or other plurality of wells such that it is capable of obtaining an image which includes all of the wells of a multi-well, or microtiter plate. The multi-well plate generally includes 96 or 384 wells, however, one should appreciate that the multi-well plate may include other numbers of wells such as more than 384 wells. Advantageously, the camera device not only allows observation of the multi-well plate as a whole, but also allows observation of each well individually. In one embodiment, the camera incorporates an optical filtering stage rendering the detector capable of spectral measurements and tunable to specific chemicals that exhibit specific absorptivities in the spectrum. An optical filter useful in the present embodiments can be any device for selectively passing or rejecting passage of radiation in a wavelength, polarization or frequency dependent manner.

As illustrated in FIG. 3, the camera can transfer an image electronically to a storage location, such as the image servers 160A,B. In the exemplary embodiment shown in FIG. 3, the control system 150 is configured to control each of the cameras. For example, image control software may be configured to signal the camera device, via the central network, when to take an image of a multi-well plate of the oligonucleotide synthesizer 10. The image may be transferred to the image process servers 160A,B in the form of a JPEG, TIFF, BMP file or other suitable file format. An exemplary example of an image of a microtiter plate is shown in FIG. 6.

In particular embodiments, the image files are named according to batch number, plate number, or cycle number within the synthesis protocol that the synthesis process is at when the image is taken. In this respect, the term "cycle" refers to the complete cycle of steps for the addition of each base to the growing DNA chain including, without limitation, the deprotection, coupling, capping, and oxidation steps. It will be understood that an operation can be performed one or several times within the same cycle. Any of the steps set forth herein or otherwise useful in the present embodiments can be carried out as one or more repetitions of the particular step. For example, the deprotection step may repeat two or three times within the same cycle whereby a repetition designation can be used to differentiate the particular deprotection operation within a cycle.

Figure 9:
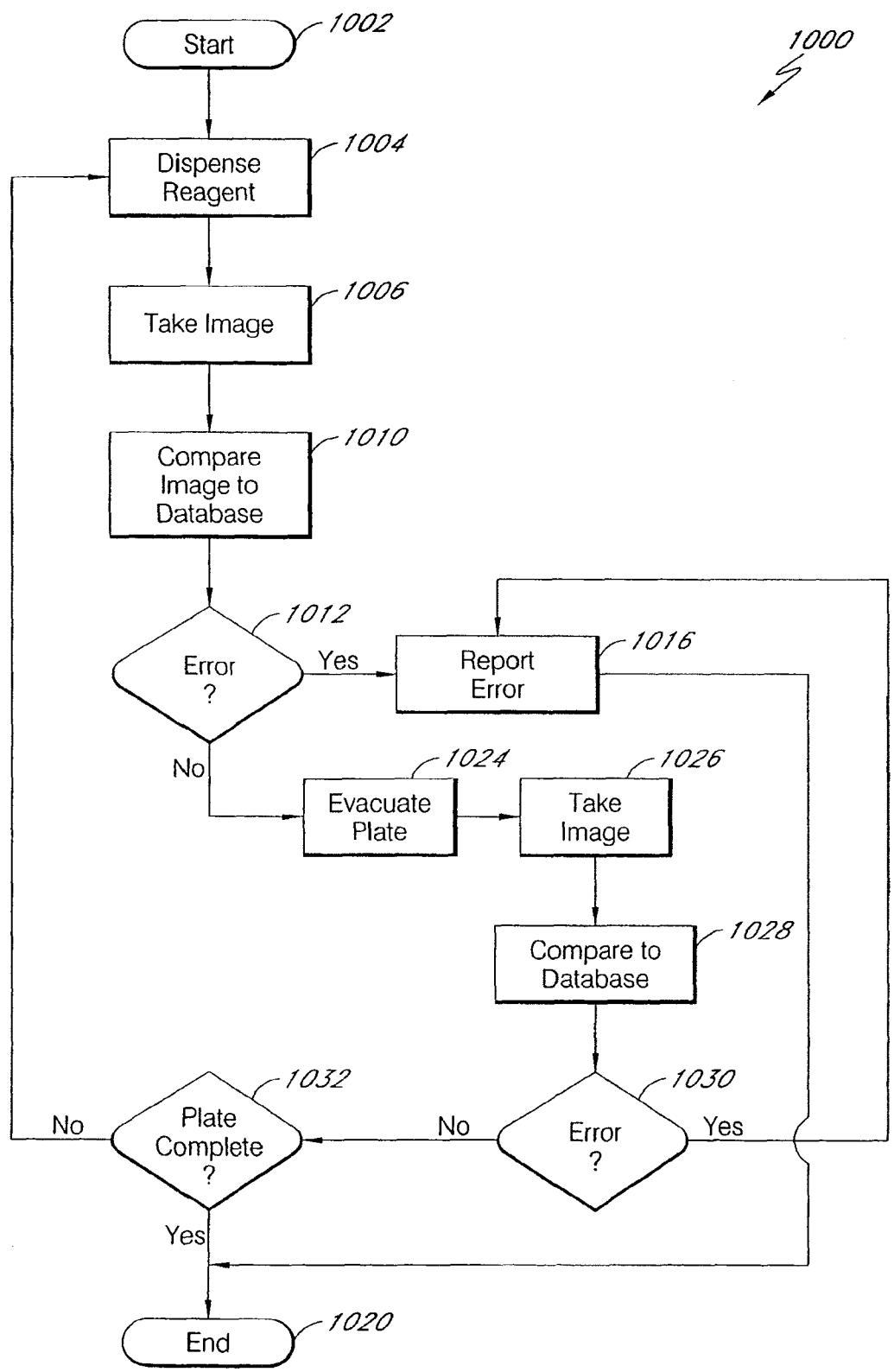
FIG. 9 is a flow diagram of one embodiment of a method for dispensing reagents into a microtiter plate within a continuous polymer synthesizer.

FIG. 9 is a flow diagram showing one embodiment of a method 1000 for continuously synthesizing molecules. The method 1000 begins at a start state 1002 and then moves to a state 1004 wherein reagents are dispensed from dispensing valves into a microtiter plate as the plate rotates on a rotary table. After all wells of the microtiter plate have passed under the dispenser valve, the microtiter plate moves below a camera so that an image is taken at a state 1006. The microtiter plate can be illuminated with a light source such as an LED array. The camera can be placed directly above the rotary table and the LED array can be placed to cast light in a direction towards the light path between the plate and camera such that the two light paths intersect. A beam splitter can be placed between the camera and plate at the intersection point and in a configuration, whereby light emitted from the LED is reflected to the plate by the reflective side of the beam splitter and whereby the camera obtains an image of the lighted plate through the transparent side of the mirror. One exemplary image can be found with reference to FIG. 6. Further description of imaging systems useful in the present embodiments and appropriate configurations are described in U.S. Pat. App. Pub. No. 2004/0219063.

Once an image of the microtiter plate has been taken, it is compared to a database of sequence data at a state 1010 to determine whether each well of the microtiter plate that was supposed to have received a reagent is found to be filled. A file contained in the database and used for the comparison can include an expected property for a well based on the presence or absence of a particular volume of liquid. For example, the file can provide a numerical scale ranging from an arbitrary dark value (for example, 4096) to an arbitrary bright value (for example, 0). The values can be assigned for a well based on one or more calibration images obtained for a plate that has been evacuated of solution, that contains an optically clear solution and/or that contains an optically dense solution. In regard to the example of a scale from 0 to 4096, an evacuated well can have a value or range of values near 4096, a well containing trityl can have a value or range of values near 0 and a well containing an optically clear solution can have a value or range of values between those for the emptied or trityl containing well. The ranges of values can be contiguous or alternatively can have gaps between them. The optical density can be measured for a plate during synthesis and its optical density compared to the numerical scale to determine if it falls in the range of an empty, full, or trityl containing well. If the comparison results in a desired range, for example, an evacuated well has an optical density in the range near 4096, then synthesis for the well is allowed to proceed. If the comparison results in a range that is outside of the desired range, for example, occurring in a gap or in the range near 0, an error can be indicated and synthesis to the well discontinued.

For the above-described images, the optical densities can be determined for the center of a well or for a specific portion of a well such as a central region of the well. Typically, the location of wells is registered such that any image used for determining optical density excludes the edges of wells. Furthermore, individual wells are typically calibrated and compared on an individual basis to compensate for different lighting effects at different parts of the plate. Although image comparison is described above with respect to optical density, it will be understood that other values can be used in a comparison file in place of optical density such as the standard deviation for the distribution of optical densities measured in a region of a well or the skew for the distribution.

The process 1000 then moves to a decision state 1012 wherein a determination is made whether any errors occurred following comparison of the image to the database. Such an error may be that a well that was supposed to have received a reagent is not found to have a reagent within that well. Another error may be that a well that is supposed to be empty is found to be filled with a reagent solution. If an error has been found then process 1000 moves to a state 1016 wherein the error is reported back to the main system for further processing. The further processing may be, for example, that this well is marked as bad and thus does not receive further reaction solutions while the remaining wells in the microtiter plate are completed. Additionally, the entire microtiter plate can be marked as bad and the system thereafter instructed to load a new microtiter plate onto the continuous synthesizer in order to carry out the reactions that were to occur in the bad microtiter plate. Alternatively or additionally a written or displayed report can also be produced for the user of the system in order to notify the user that such an error has occurred. Once the error has been reported at the state 1016 the process 1000 terminates at an end state 1020.

However, if an error did not occur at the decision state 1012 then the process 1000 evacuates the microtiter plate at a state 1024 and thereafter takes another image at a state 1026 in order to determine whether each well has been properly evacuated. At a state 1028 the image taken of the evacuated multi-well plate is compared to a database.

The process 1000 then determines whether any errors occurred at a decision state 1030 and if an error did occur the process returns to the error reporting state 1016. However, if no errors occurred then the process moves to a decision state 1032 to determine whether the synthesis reactions within the plate have been completed. If they have been completed then the process terminates at the end state 1020. However if the synthesis reactions within the plate have not been completed at the decision state 1032 the process 1000 returns to the state 1004 to dispense additional reagents into the plate in order to continue the synthesis reactions.

Exemplary Oligonucleotide Synthesis Embodiments

Figure 4:
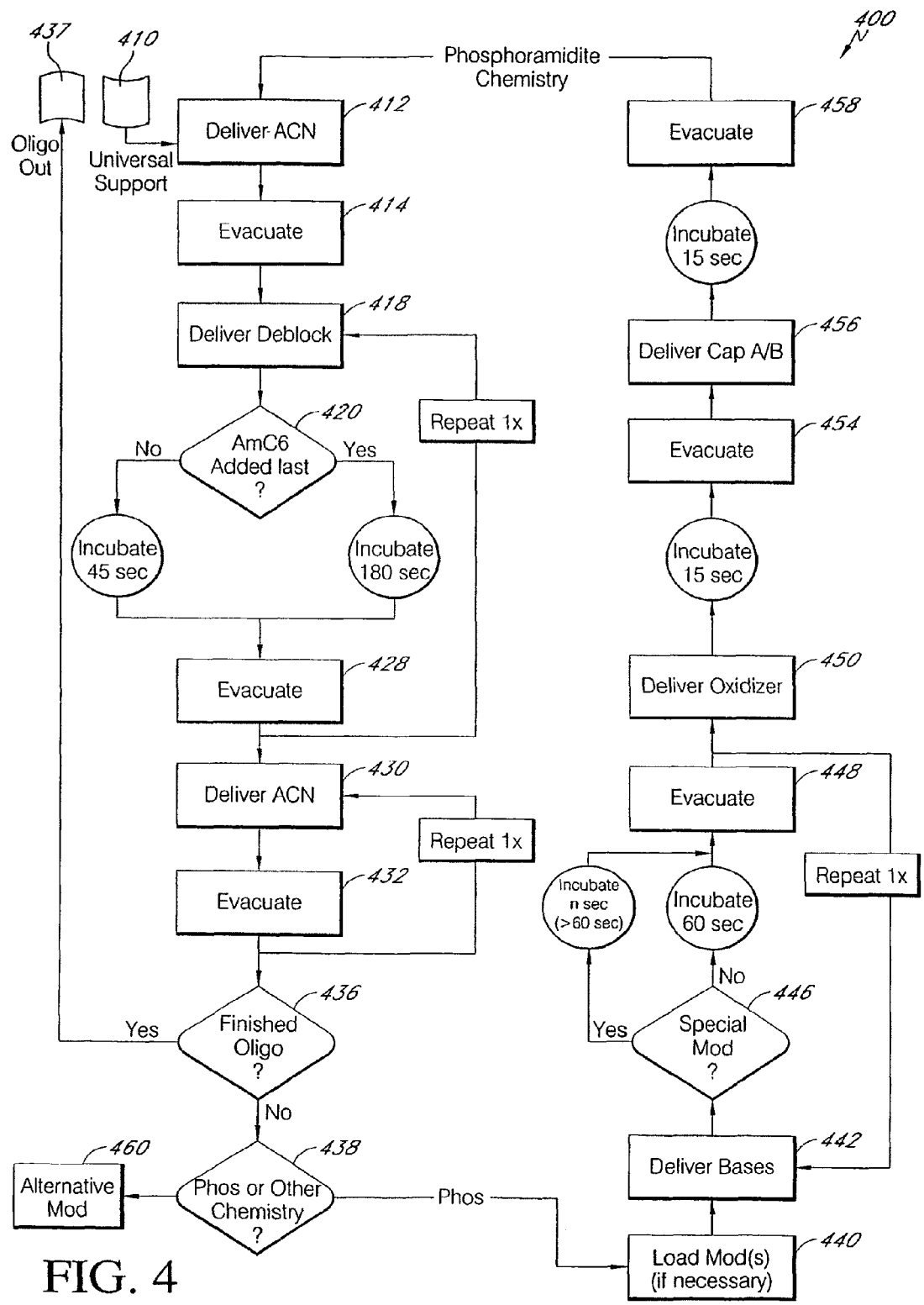
FIG. 4 is a flow diagram of one embodiment of a method for synthesizing oligonucleotides.

FIG. 4 is a flow diagram illustrating an exemplary method 400 for synthesizing oligonucleotides. The method begins at a state 410 wherein a universal support is provided which is used as the anchor for the oligonucleotide. In one embodiment, the universal support is a universal controlled pore glass (CPG) substrate that is configured to be used to initially anchor any nucleoside. One such universal CPG is available from Proligo Reagents (Boulder, Colo.). Once the universal support is provided, typically within wells of a filter-bottom microtiter plate, the process 400 moves to a state 412 wherein acetonitrile (ACN) is used to wash the universal supports. Each well is then evacuated at a state 414 such that wash solution is removed while the universal support is retained in the well. A deblocking solution, containing trichloroacetic acid, is then delivered to each of the wells at a state 418.

A determination is then made at decision state 420 whether or not an AmC6 modification is to be added to the oligonucleotide being synthesized. If an AmC6 modification is to be added, then the method 400 incubates the deblocking solution for 180 seconds. If there is no AmC6 modification, then the method 400 incubates the blocking solution for 45 seconds. The deblocking solution is then evacuated at a state 428 and the method 400 returns to state 418 to cycle one more time through the addition of the deblocking solution. Once the method 400 has performed an additional cycle, another wash of ACN is performed at a state 430, followed by an evacuation at a state 432, and then a repeat of the ACN wash.

A determination is then made at a decision state 436 whether or not the oligonucleotide synthesis is finished. If the oligonucleotide is done being synthesized, then it is marked for completion at a state 437 and the method 400 terminates. However, if the oligonucleotide synthesis is not complete, then a determination is made at a decision state 438 whether or not the oligonucleotide is to include a modification to the 5' end added by phosphoroamidite type chemistry or another alternative method.

If a decision is made that the oligonucleotide is to be modified at its 5' end using phosphoroamidite type chemistry then the process 400 loads any nucleotide modifications at a state 440 and then delivers those nucleotide bases to the reaction sites at a state 442. For example, if an oligonucleotide is to be modified to include an amino group at the 5' end then monomethoxytritylaminohexyl phosphoramidite (MMT 5' C6 Amino linker available as cat. #C-1001 from Trilink, San Diego Calif.) can be loaded and delivered. A decision is then made whether any special modifications are necessary at a decision state 446 wherein if no modifications are necessary the synthesizer incubates the oligonucleotides for sixty seconds, whereas if special modifications have been delivered then the reactions are incubated for the appropriate period of time based on the type of modification that was introduced at the state 440.

The microtiter wells are then evacuated at a state 448 and an oxidizer solution is delivered at a state 450. The oligonucleotides are then incubated for fifteen seconds and each well is evacuated at a state 454 in order to remove the oxidizer solution.

At a state 456 the process 400 delivers the capping solution to each of the wells and then incubates for approximately fifteen seconds. The capping solution is then evacuated at a state 458 and the process 400 returns to the state 412 wherein an acetonitrile wash solution is introduced into each of the wells.

It should be realized that if a determination was made at the decision state 438 that 5' modification is to be carried out by a different method than the phosphoramidite method set forth above, then the process 400 moves to a state 460 wherein the alternative method is carried out. Upon completion of the alternative method, the oligonucleotide is then removed at the state 437.

Of course it should be realized that the synthesis process 400 is only one exemplary method for synthesizing oligonucleotides using the continuous synthesizer 10. Other synthesis reactions and conditions are also contemplated to be within the scope of the present embodiments. Those skilled in the art will recognize that different reaction solutions, reaction times, or sequences of reactions can be adapted for use in the present embodiments, for example, by providing an appropriate spatial and temporal relationship between an array of reaction sites and array of stations moving relative to each other in accordance with the teachings herein.

Exemplary Plate Module

Figure 5A:
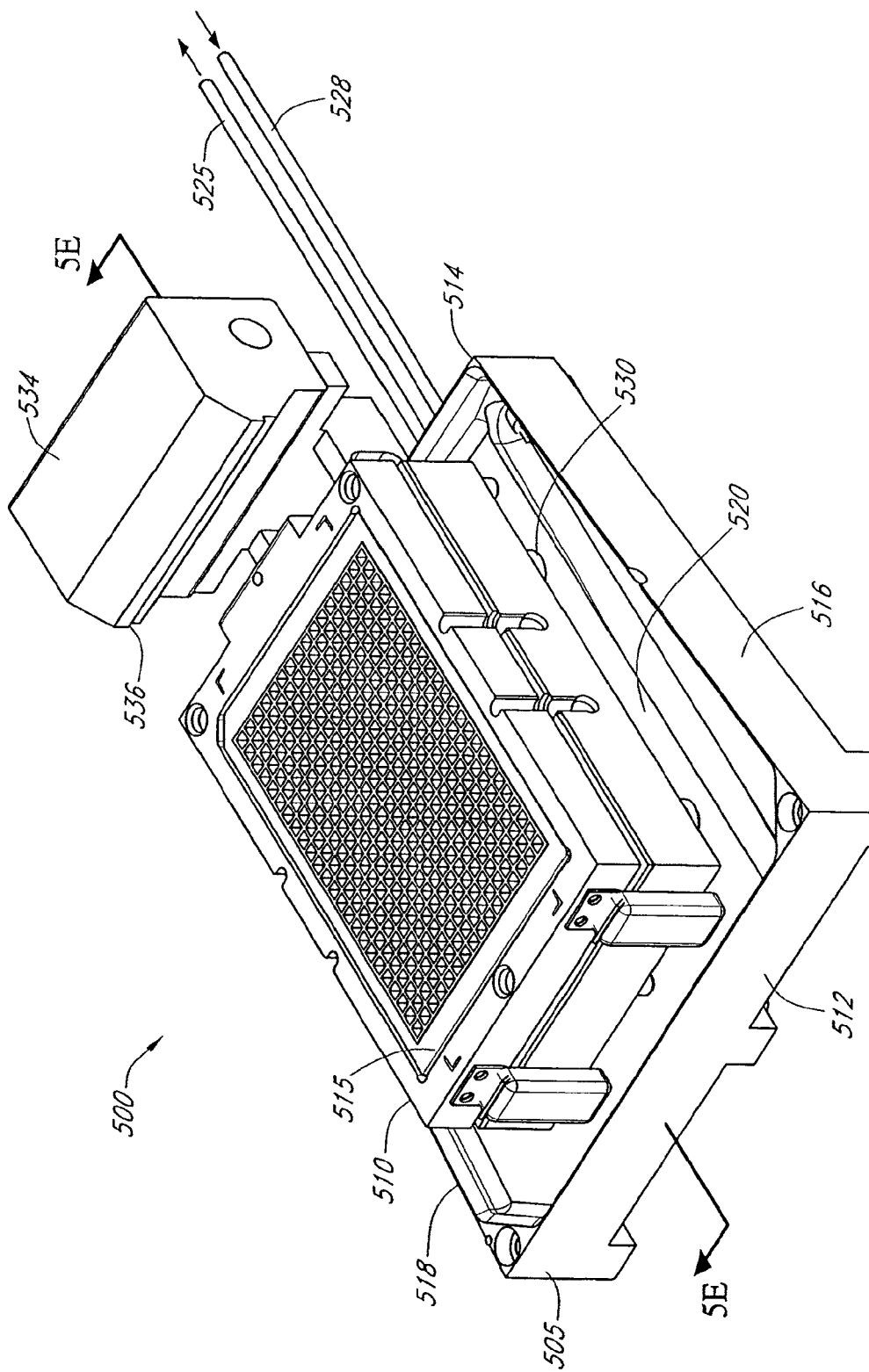
FIG. 5A is a perspective view of one embodiment of a plate module and its associated plate holder that are configured to be used within the continuous oligonucleotide synthesizer of FIG. 1.

FIG. 5A illustrates an exemplary plate module system 500 that includes an overflow tray 505 configured to hold a plate holder 510. As illustrated, the plate holder 510 is designed to hold a microtiter plate 515 so that it can be easily loaded and unloaded from the synthesizer 10. The overflow tray 505 is generally rectangular in shape and includes a front edge 512, a rear edge 514, a left edge 516 and a right edge 518. A central surface 520 of the overflow tray 505 is configured to hold the plate holder 510. In use, the overflow tray 505 is mounted to the rotary table 20 and provides the means by which the plate holder 510 is loaded and unloaded onto the synthesizer. In one embodiment, the plate holder is deposited or removed from the plate module while the rotary table is turning. This allows the synthesizer to continuously synthesize even as the plate holders are being loaded and unloaded from the synthesizer As can be envisioned, a filter-bottom microtiter plate is first secured into a plate holder. The plate holder is then manually, or automatically, loaded onto the synthesizer by placing the plate holder into an overflow tray. The plate module, which is fixed to the rotary table, then rotates around the synthesizer as the rotary table turns.

As shown, the plate holder 510 rests in the central surface 520 of the overflow tray 505. The configuration of the plate holder 510 will be explained more completely with reference to FIG. 5B. As illustrated, a vacuum line 525 and a nitrogen line 528 enter the overflow tray 505 through the rear edge 514. The vacuum line 525 runs inside the overflow tray 505 and communicates with a vacuum interface 530 in the central surface 520 of the plate module. When the plate holder 510 is properly placed onto the overflow tray 505, the vacuum interface 530 provides a source of vacuum for removing reaction solutions such as wash solutions or reagent containing solutions from the filter-bottom microtiter plate that is housed within the plate holder 510.

The nitrogen line 528 communicates with a nitrogen knife 534 attached to the rear edge 514 of the overflow tray 505. As illustrated, the nitrogen knife 534 includes a longitudinal opening 536 which is configured to output a generally flat sheet of nitrogen gas which layers over the microtiter plate 515 within the plate holder 510. In one embodiment, the nitrogen gas acts to quarantine the reaction solutions from the ambient environment and also remove any vapor phase material from areas proximate to a reaction site. Also, when the vacuum line 525 is activated to evacuate liquids from the microtiter plate 515, a layer of nitrogen gas can be provided above the microtiter plate.

In one embodiment, the synthesizer outputs nitrogen gas at the same time that the vacuum is actuated, thus pulling nitrogen gas into each well of the microtiter plate during the evacuation process. This prevents ambient air or contaminants such as aerosolized reagents from being forced into contact with reaction products while passing through the filter bottoms of the wells. Because nitrogen is an inert gas, it is much less likely to cause a reaction with reaction products such as polymeric molecules being synthesized within each well of the microtiter plate. Of course, it should be realized that the present embodiments are not limited to only using nitrogen gas to overlay the microtiter plate. Any type of gas, preferably inert gas, such as argon or helium, is also within the scope of the present embodiments. In an alternative embodiment, a device similar to the quarantine devices described above can be used for delivery of a reactive gas to a reaction site in a system of the present embodiments. Gas, either inert or reactive, can also be provided by one or more stationary stations, such as dispensing stations or imaging stations such that when the plates are evacuated they ingest this gas preferentially over ambient air or pollutants. For example, imaging stations 38A-F can include a plenum between an upper window for the detector and a microtiter plate below. The plenum can be purged with nitrogen such that gas flows in a direction that is substantially normal to the microtiter plate. The flow of nitrogen gas can provide the advantages of removing moisture and debris from the window as well as displacing harmful vapors to reduce unwanted contact of these vapors with reaction products when the microtiter plate is vacuum evacuated at the imaging station.

Figure 5B:
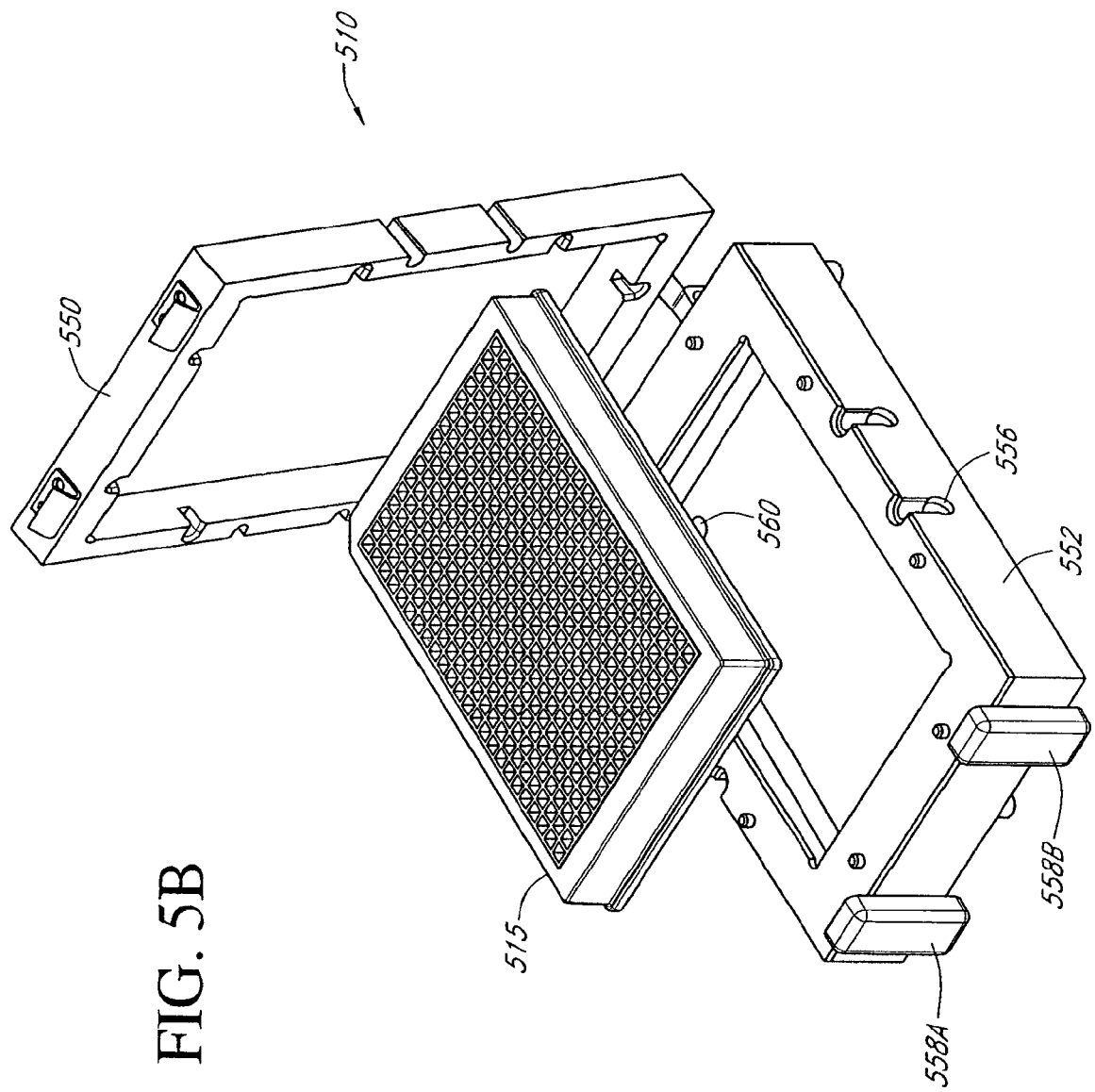
FIG. 5B is a perspective view of one embodiment of the plate holder illustrated in FIG. 5A.

Referring now to FIG. 5B, the plate holder 510 includes an upper frame 550 which is configured to lock with a lower portion 552 of the plate holder 510. Within the lower portion 552 is a recessed opening 556 which is sized to hold the microtiter plate 515. Thus, when the frame 550 is closed against the lower portion 552, the microtiter plate 515 is held in place within the plate holder 510. A set of locks 558A,B reversibly lock the frame 550 against the lower portion 552. As shown, a circular vacuum interface 560 is located in the recessed opening 556 and provides a through-hole to the vacuum source within the plate module 505.

Figure 5C:
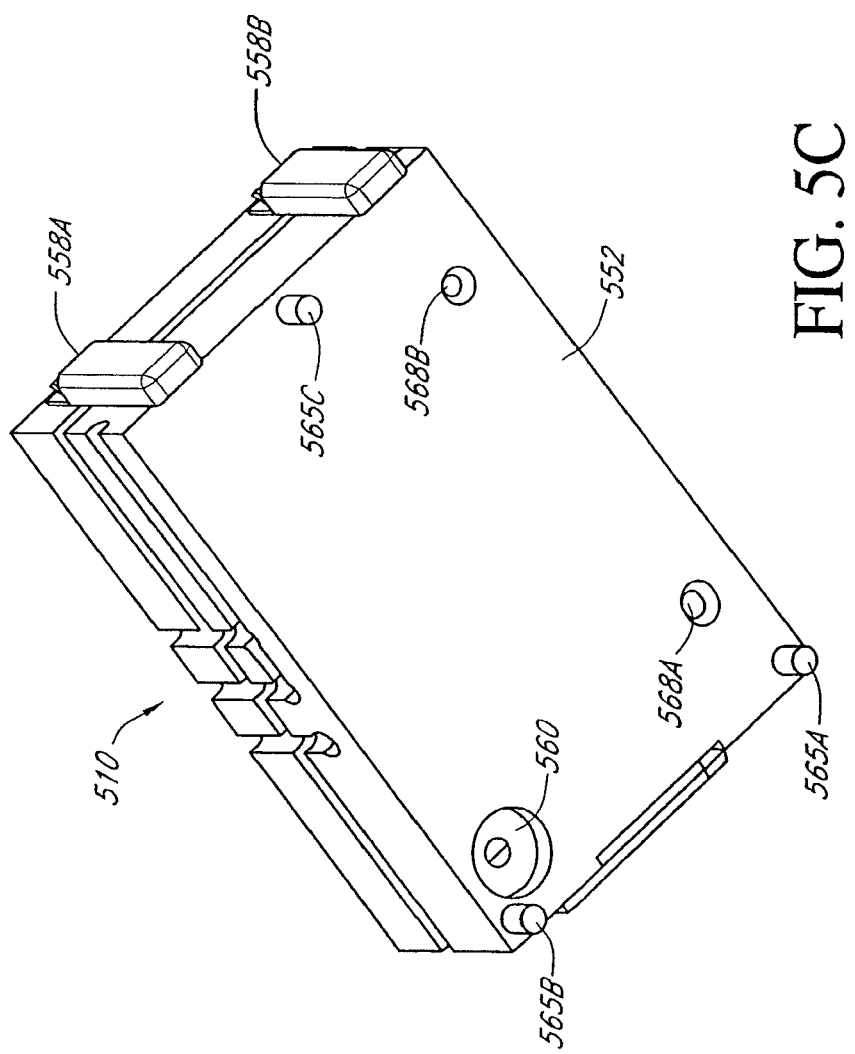
FIG. 5C is a perspective view of the bottom of the plate holder shown in FIG. 5B.

Referring now to FIG. 5C, the lower portion of the vacuum interface 560 can be seen through the bottom lower portion 552 of the plate holder 510. In addition, a set of three stacking pins 565A, B, C are provided in order to raise the lower portion of the plate holder 510 from the central surface of the overflow tray 505. In addition, a set of alignment holes 568A, B are provided such that the plate module 510 aligns correctly within the central opening 520 of the overflow tray 505.

Figure 5D:
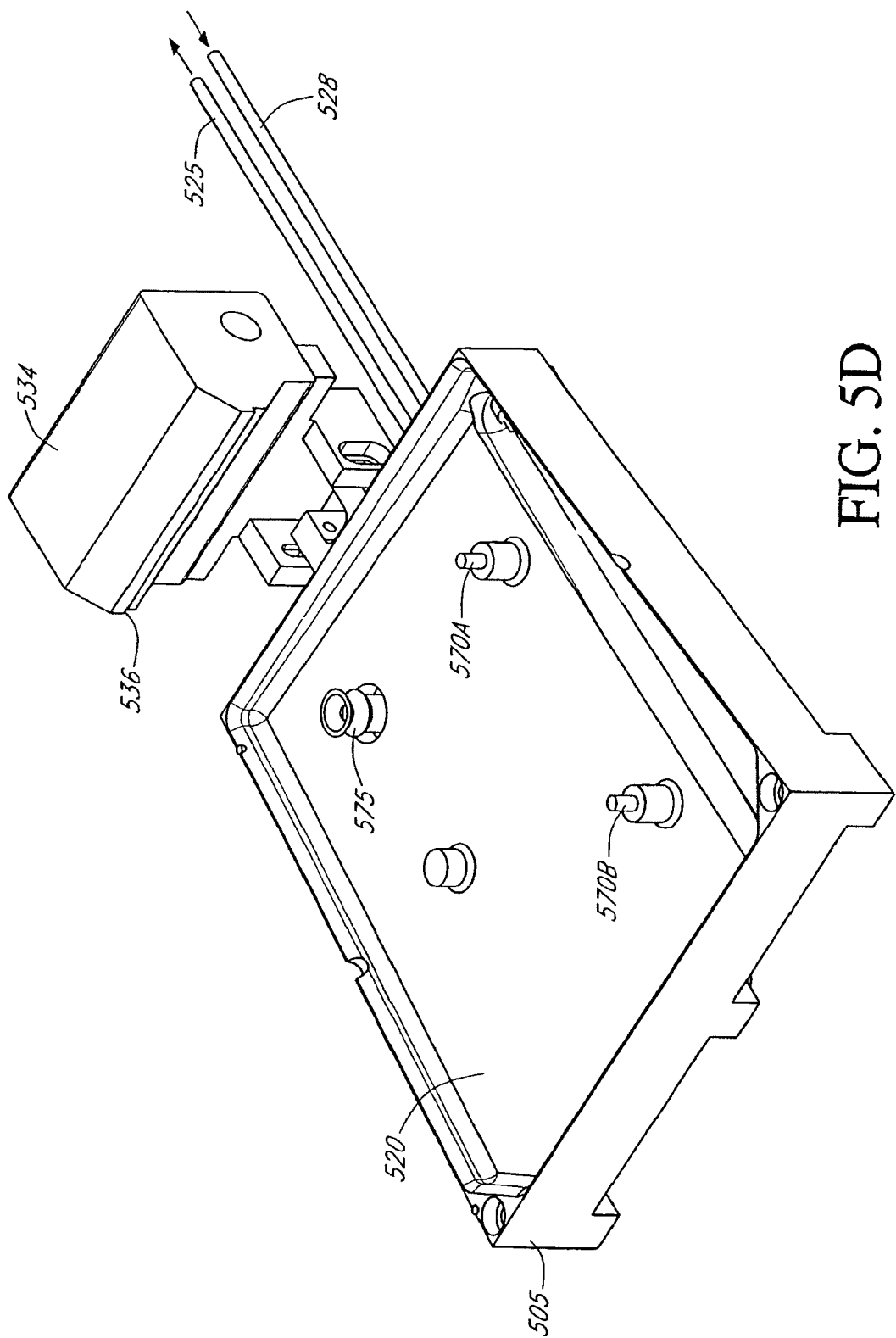
FIG. 5D is a perspective view of the plate module shown in FIG. 5A.

As shown in FIG. 5D, a set of alignment pins 570A, B are illustrated in the central surface 520 and configured to mate with the alignment holes 568A, B of the plate holder 510 (FIG. 5C). In addition, a vacuum suction bellows 575 is shown protruding from the central surface 520 and configured to reversibly mate with the vacuum interface 560 of the overflow tray 505.

Figure 5E:
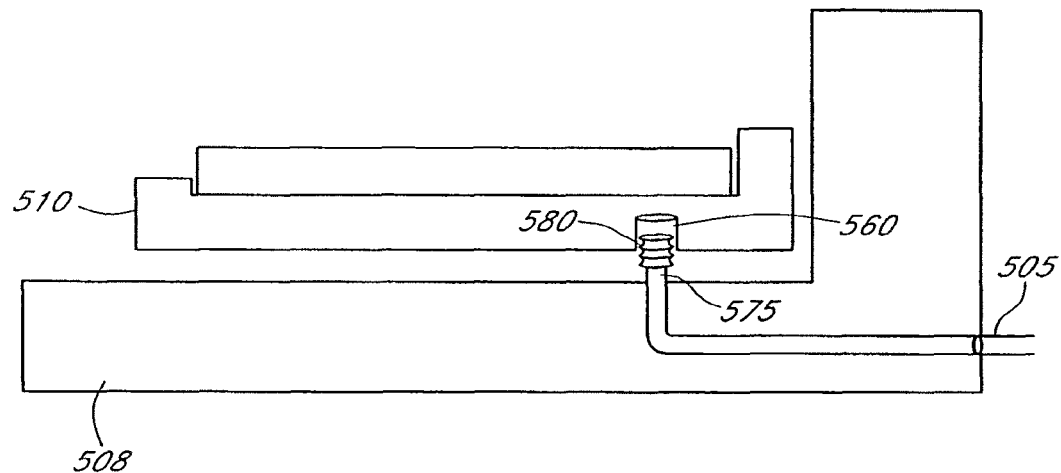
FIG. 5E is a cross-sectional view of a plate holder mounted onto a plate module taken across the line 5E-5E of FIG. 5A.

As shown in FIG. 5E, a cross sectional view of the plate holder 510 mated with the overflow tray 505, the vacuum section bellow 575 reversibly mounts within the vacuum interface 560 so that the vacuum line 525 can evacuate reaction solutions from within the microtiter plate 515. The vacuum suction bellow 575 is preferably a flexible polymeric material, such as silicon or rubber, and is configured to provide a quick and efficient reversible seal with the vacuum interface 560. As illustrated, the vacuum suction bellows 575 includes compressible portions 580 which are adapted to compress or expand as the plate holder 510 is placed on top of the bellow 575.

As should be realized, when the plate holder 510 is placed onto the overflow tray 505, the bellows 575 becomes recessed within the vacuum interface 560 of the plate holder. The compressible portions 580 of the bellows allows the vacuum interface 560 of the plate holder to be dropped on top of the bellow, and thereafter have the compressible portions 580 compress and create a vacuum tight seal between the plate holder 510 and the overflow tray 505.

In accordance with the embodiments set forth above, a module system of the present embodiments can be configured to provide the non-limiting advantages of (1) convenient addition and removal of a first reaction site without interrupting synthesis occurring for a second reaction site, (2) providing a continuously available solution removal device such as a valve attenuated vacuum source, and/or (3) providing a continuously available quarantine device such as a valve attenuated gas knife. Those skilled in the art will recognize that a similar module system can be used to hold a substrate for reaction sites having other configurations including, for example, a multi-well plate having a shape or number of wells that differs from the microtiter plate exemplified above. Furthermore, a module system of the present embodiments can be configured for use with other reaction site substrates such as those described elsewhere herein. In embodiments including vacuum based removal of solutions, filter based substrates are particularly useful.

Exemplary Devices and Methods for Dispensing Liquids

Figure 7:
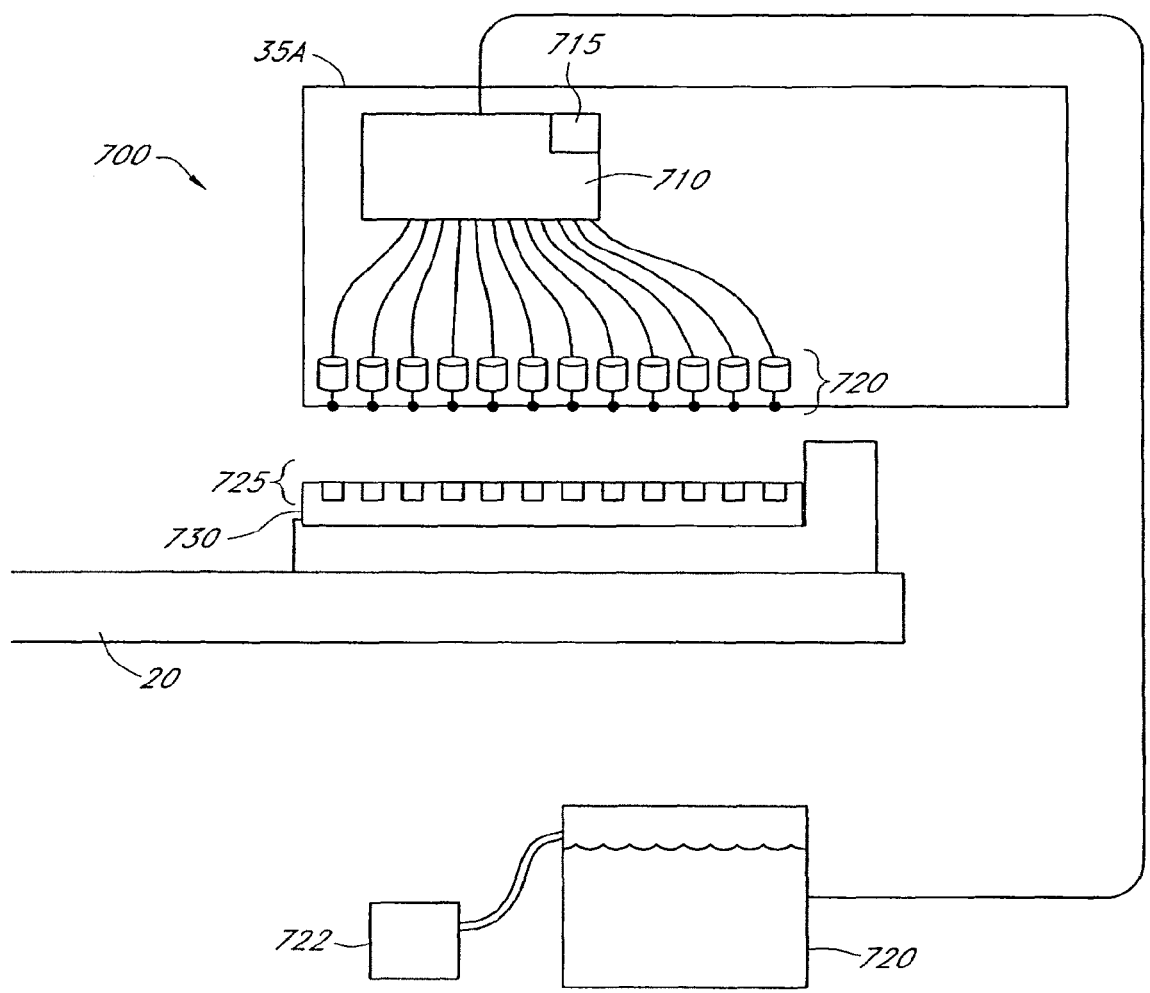
FIG. 7 is a schematic diagram of one embodiment of a system for dispensing reaction solutions within a continuous polymer synthesizer.

Referring to FIG. 7, a diagram of an exemplary system 700 for providing reaction solutions to the dispenser 35A is illustrated. Within the dispenser 35A is a local reservoir 710 that hold the reaction solutions that are to be dispensed by the dispenser 35A. A set of level detectors 715 are used to measure the level of the local reservoir and determine when it is time to pump more reaction solution from a storage tank 720. As shown, the storage tank 720 is connected to a helium source 722 which is used to pressurize the storage tank 720. The helium pressure can be adjusted, for example, under computer control to force additional reaction solution to the local reservoir 710 when the level detectors 715 indicate that the local reservoir 710 is below a predetermined threshold.

By providing a local reservoir of reaction solutions, the system can provide smoother and more reliable dispensing because the liquids do not have to travel through long lines to reach each valve. Any gas pockets or other small changes in pressure within one of such lines can lead to undesirable dispensing conditions, especially when the volumes to be dispensed are very small. In particular, use of a hydraulically coupled local reservoir can provide the advantage of eliminating pressure variations that typically occur across a manifold that is connected to multiple dispenser valves, such as the pressure variance that arises due to differences in the number of valves that are open at any given time and the pressure variances that are caused by the opening and closing of valves. Elimination of such effects using, for example, hydraulically coupled local reservoirs provides for staggered firing of individual dispenser nozzles wherein any number of valves can be actuated at any time, as set forth below.

The local reservoir 710 is fluidly connected to a series of solenoid valves 720 which are independently controlled by the control system 150 to independently control fluid delivery from individual dispenser nozzles. The control system 150 provides commands to the valves 720 to dispense reaction solutions from the local reservoir 710 when wells 725 of a microtiter plate 730 are properly aligned below each valve.

In particular embodiments, a system can be configured for staggered dispenser valve actuation such that staggered liquid dispensing occurs from a set of dispenser nozzles. As reaction sites arrive at each of the dispenser stations, solenoid valves can control reagent dispensing. Each reagent dispensing station can use multiple solenoid valves that are fired one at a time or in groups depending on the size of the power supply utilized. The number of simultaneous valve actuations per reagent can be constrained in order to limit the electrical current demand and therefore the size of the power supplies, if desired.

A dispensing station can be configured to deliver a different volume of fluid from different dispenser nozzles if desired. Alternatively or additionally, each dispenser nozzle can be controlled to deliver fluid at different start times, for example, as set forth above. The ability to dispense different volumes of fluid and to do so at different start times provides advantages over typical fixed volume or positive displacement type dispensers by allowing a high level of control over reagent utilization during a synthetic operation.

A valve dispenser useful in the present embodiments can be controlled using a hardware abstraction layer (HAL) that fires valves and manages the filling and pressurization of local reservoirs. Discrete logic can be used, for example, via a complex programmable logic device (CPLD), to implement a finite state machine for the local reservoir filling and to generate spike and hold signals that control the valves. The discrete logic for each spike and hold circuit for each valve is typically separate and independent of one another. This allows all valves to be fired simultaneously, slightly staggered, or selectively such that one or more are fired and others are not during a finite time period. Use of a hardware abstraction layer to control a multi nozzle dispenser provides advantages over the use of a microprocessor because a HAL can be scaled to the use of larger numbers of nozzles without increases in cost and computation time that can occur when a microprocessor is used. However, it will be understood that if desired a microprocessor can be used in the present embodiments, for example, in cases where a relatively small number of nozzles is to be controlled.

Figure 11:
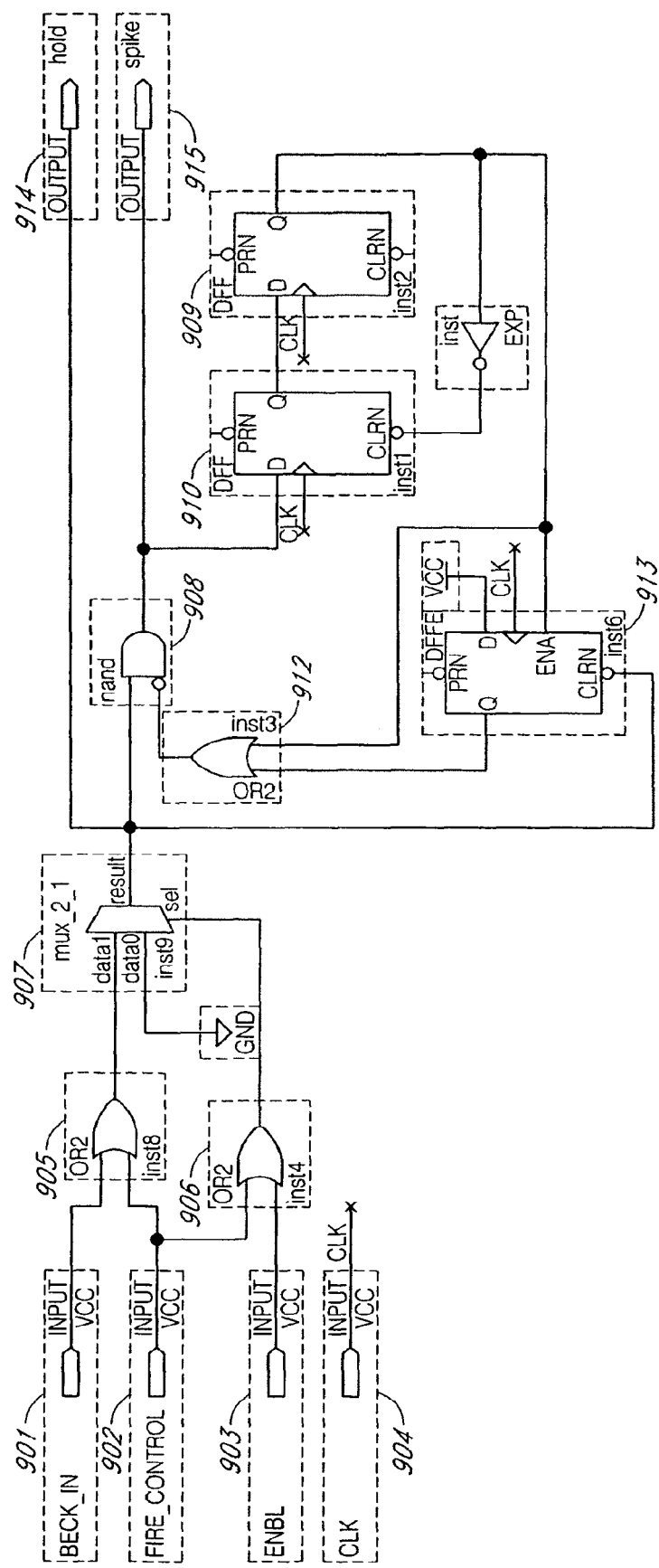
FIG. 11 shows a circuit diagram for a hardware abstraction layer useful for controlling a fluid dispenser.

Exemplary logic for a HAL that is useful for controlling an individual valve in a dispensing station of the present embodiments is shown in the form of the circuit diagram of FIG. 11. The circuit diagram exemplifies control via two outputs including a spike output 915, which provides a first voltage that is activated immediately and for a discrete time period of a relatively short duration, and a hold output 914 which provides a second voltage that is activated after the spike output and is maintained for a discrete time period of a longer duration. Spike output 915 is at a voltage sufficient to open the valve, whereas the hold output 914 is at a lower voltage, sufficient to maintain the valve in an open state. The HAL can receive four different inputs including inputs 901, 902, 903 and 904. Input 901 is configured to receive a logic "high" signal received from an I/O interface and controls the valve in response to signals generated from a firing table. The signal from input 901 is processed in accordance with the activities of other inputs via OR gate 905 and multiplexer 907. The timing for the outputs is controlled by passage of the signal from OR gate 905 through an NAND gate 908, flip flops 909, 910 and 913, then OR gate 912 and back to OR gate 908. The clock cycle is selected to control duration of the spike and hold outputs. For example, in the HAL diagram of FIG. 11 the spike output 915 has a duration of 1 millisecond which corresponds to two clock cycles. Input 902 is configured to allow manual firing of a valve, for example, via a switch that is connected to all valves in a dispenser device. Input 903 is configured to allow a signal to be sent to the HAL for the purpose of turning valve indicator LED's on or off to make a desired pattern, for example to communicate a message to a user. Input 904 receives signals from a clock. Circuitry such as that shown in the diagram can be replicated ad-infinitum for as many valves as necessary.

A requirement for a relatively large amount of energy can arise should the occasion of firing all valves simultaneously present itself to the HAL. In this case, enough current to source the spike of all of the valves can be stored locally. Any of a variety of capacitors known in the art can be used to store the current. Local storage of current reduces the instantaneous demand for current on the power supply used for the dispenser, thereby providing advantages of reducing the cost of the power supply and reducing the amount of space required to house the power supply. Thus, the HAL is typically configured to store at least an amount of energy sufficient to fire all of the valves simultaneously.

FIG. 8A shows a diagram of one embodiment of a dispenser 35A as it is outputting solutions to a microtiter plate 515 simultaneously with movement of the microtiter plate via the rotary table 20. As shown, within the dispenser 35A are a series of linear valve arrangements 805, 810, 815, 820, 825, 830 and 835. Each linear arrangement of valves is fluidly connected to the same reagent solution reservoir and a different reservoir delivers solution to each linear arrangement of valves. For example, the valve column 805 is connected to a modified nucleoside. Valve column 810 is connected to an adenosine solution, column 815 is connected to a cytidine solution, column 820 is connected to a guanosine solution and column 825 is connected to a thymidine solution. It will be understood that the sugar moiety for the nucleosides is typically a deoxyribose for synthesis of DNA. However, monomers can contain other moieties such as ribose sugars useful for synthesizing RNA or moieties used for synthesizing nucleic acids having alternative backbones such as peptide nucleic acids (PNA). Columns 830 and 835 can be connected to, for example, ACN wash solutions, deblocking solutions or capping solutions depending on their position in the synthesizer. Of course it should be realized that the number and type of valve-reservoir connections used in the present embodiments can be altered from those exemplified above to suit a particular application. For example, each dispenser may have only one valve column, or any other number of valve columns without departing from the spirit of the present embodiments. In one embodiment, the valve columns are removable and interchangeable so that a particular dispenser can be outfitted with any number of valve columns to dispense the correct solutions for synthesizing a polymer.

INCORPORATION BY REFERENCE

All references cited herein, including patents, patent applications, papers, text books, and the like, and the references cited therein, to the extent that they are not already, are hereby incorporated herein by reference in their entirety.

EQUIVALENTS

The foregoing written specification is considered to be sufficient to enable one skilled in the art to practice the present embodiments. The foregoing description and Examples detail certain preferred embodiments and describe the best mode contemplated by the inventors. It will be appreciated, however, that no matter how detailed the foregoing may appear in text, the present embodiments may be practiced in many ways and the present embodiments should be construed in accordance with the appended claims and any equivalents thereof.

The term "comprising" is intended herein to be open-ended, including not only the recited elements, but further encompassing any additional elements.

What is claimed is:

1. A method for synthesizing molecules, comprising:
   (a) providing a control system and a stage comprising a plurality of reaction sites in a fixed order and at fixed distances from one another,
   (b) providing a plurality of dispensing stations connected to the control system and configured to deliver reagents to said reaction sites to start a reaction, wherein said dispensing stations are located along said stage at fixed distances from one another and wherein said control system correlates said fixed distances to the duration for said reaction thereby providing a schedule for rotating the stage; and
   (c) rotating the stage and sequentially dispensing said reagents into said reaction sites on said schedule so that a first reaction in a reaction site is completed before a second reaction in said reaction site is initiated; and
   said reaction sites rotate from a first dispensing station to a second dispensing station during a step of said reaction, wherein said step of said reaction is completed before said reaction site is positioned below said second dispensing station.

2. The method of claim 1, wherein said molecules comprise polymers.

3. The method of claim 2, wherein sequentially dispensing said reagents comprises sequentially dispensing monomers to said polymers.

4. The method of claim 1, wherein said stage comprises a circular table.

5. The method of claim 4, wherein said dispensing stations are located along an outer circumference of said circular table.

6. The method of claim 5, wherein said circular table rotates at a predetermined speed so that said reaction sites move below said dispensing stations at a predetermined time.

7. The method of claim 1, wherein said molecules comprise nucleic acids.

8. The method of claim 7, wherein sequentially dispensing said reagents comprises sequentially dispensing nucleotides to said nucleic acids.

9. The method of claim 1, wherein said molecules comprise polypeptides.

10. The method of claim 9, wherein sequentially dispensing said reagents comprises sequentially dispensing amino acids to said polypeptides.

* * * * *